(12) United States Patent
Sakurai et al.

(10) Patent No.: US 11,873,364 B2
(45) Date of Patent: Jan. 16, 2024

(54) METHOD FOR PRODUCING CONJUGATED DIENE RUBBER

(71) Applicants: ZEON CORPORATION, Tokyo (JP); SUMITOMO CHEMICAL COMPANY, LIMITED, Tokyo (JP); ZS ELASTOMERS CO., LTD., Tokyo (JP)

(72) Inventors: Takuro Sakurai, Tokyo (JP); Takashi Iizuka, Tokyo (JP); Mana Fujii, Sodegaura (JP); Hisakatsu Hama, Sodegaura (JP)

(73) Assignees: ZEON CORPORATION, Tokyo (JP); SUMITOMO CHEMICAL COMPANY, LIMITED, Tokyo (JP); ZS ELASTOMERS CO., LTD., Tokyo (JP)

( * ) Notice: Subject to any disclaimer, the term of this patent is extended or adjusted under 35 U.S.C. 154(b) by 625 days.

(21) Appl. No.: 16/981,941

(22) PCT Filed: Mar. 26, 2019

(86) PCT No.: PCT/JP2019/012899
§ 371 (c)(1),
(2) Date: Sep. 17, 2020

(87) PCT Pub. No.: WO2019/189204
PCT Pub. Date: Oct. 3, 2019

(65) Prior Publication Data
US 2021/0017321 A1   Jan. 21, 2021

(30) Foreign Application Priority Data

Mar. 27, 2018  (JP) .................... 2018-059451

(51) Int. Cl.
| | | |
|---|---|---|
| *C08K 3/36* | (2006.01) | |
| *B60C 1/00* | (2006.01) | |
| *C08C 19/28* | (2006.01) | |
| *C08F 297/04* | (2006.01) | |

(52) U.S. Cl.
CPC ............ *C08F 297/048* (2013.01); *B60C 1/00* (2013.01); *C08C 19/28* (2013.01); *C08K 3/36* (2013.01)

(58) Field of Classification Search
CPC ....... C08F 297/048; B60C 1/00; C08C 19/28; C08K 3/36
USPC ........................................................ 524/588
See application file for complete search history.

(56) References Cited

U.S. PATENT DOCUMENTS

| | | |
|---|---|---|
| 2014/0018490 A1 | 1/2014 | Taguchi et al. |
| 2018/0170103 A1 | 6/2018 | Sakurai et al. |

FOREIGN PATENT DOCUMENTS

| | | | | |
|---|---|---|---|---|
| CN | 103492473 A | | 1/2014 | |
| EP | 2003146 B1 | * | 12/2012 | ............ B60C 1/00 |
| JP | 2016-216545 A | | 12/2016 | |
| JP | 2016216545 A | * | 12/2016 | |
| JP | 2017-110230 A | | 6/2017 | |
| JP | 2017110230 A | * | 6/2017 | |
| JP | 2017-186533 A | | 10/2017 | |
| JP | 2017186533 A | * | 10/2017 | |
| WO | 2016/208739 A1 | | 12/2016 | |
| WO | WO-2016209043 A1 | * | 12/2016 | ............ B60C 1/00 |

OTHER PUBLICATIONS

Jun. 11, 2019 International Search Report issued in International Patent Application No. PCT/JP2019/012899.
Sep. 29, 2020 International Preliminary Report on Patentability issued in International Patent Application No. PCT/JP2019/012899.
Dec. 3, 2021 Extended European Search Report issued in European Patent Application No. 19777796.4.

* cited by examiner

*Primary Examiner* — Kelechi C Egwim
(74) *Attorney, Agent, or Firm* — Oliff PLC

(57) ABSTRACT

A method for producing conjugated diene rubber is provided, including: a first step of obtaining a conjugated diene polymer chain having an active end by polymerizing a monomer comprising a conjugated diene compound and a vinyl compound having a functional group interactive with silica using a polymerization initiator in an inert solvent; a second step of reacting a siloxane compound with the active end of the conjugated diene polymer chain having the active end; and a third step of reacting a hydrocarbyloxysilane compound with the conjugated diene polymer chain with which the siloxane compound has been reacted that is obtained in the second step.

15 Claims, No Drawings

METHOD FOR PRODUCING CONJUGATED DIENE RUBBER

TECHNICAL FIELD

The present invention relates to a method for producing a conjugated diene rubber, more particularly relates to a method for producing the conjugated diene rubber able to give a cross-linked rubber excellent in low heat buildup, wet grip, and operation stability. Further, the present invention also relates to the conjugated diene rubber obtained by the method of production and to a rubber composition containing the conjugated diene rubber and a cross-linked rubber thereof.

BACKGROUND ART

In recent years, environmental and resource issues have led to strong demands for tires for automobiles having lower fuel consumption, and safety concerns have led to demands for higher wet grip. Cross-linked rubbers prepared from a rubber composition comprising rubber and silica as a filler have lower heat buildup than that of cross-linked rubbers prepared from a rubber composition comprising carbon black, and thus result in a reduction in rolling resistance when incorporated in tires. For this reason, tires having excellently low fuel consumption can be obtained by producing tires using cross-linked rubber prepared from a rubber composition containing silica.

A variety of attempts have been made in rubber contained in such a rubber composition to increase the compatibility between the rubber and silica. For example, Patent Document 1 discloses a method for producing a conjugated diene rubber comprising: a first step of obtaining a conjugated diene polymer chain having an active end by polymerizing a monomer containing a conjugated diene compound using a polymerization initiator in an inert solvent; a second step of reacting siloxane with the conjugated diene polymer chain having the active end; and a third step of reacting a compound having a 1,6-dioxa-2-silacyclooctane structure the 8th position of which is substituted with a group having a tertiary amine structure with the conjugated diene polymer chain with which the siloxane has been reacted that is obtained in the second step.

RELATED ART

Patent Documents

Patent Document 1: International Publication No. 2016/0208739

SUMMARY OF THE INVENTION

Problem to be Solved by the Invention

In consideration of a recently increasing demand for the performance of tires for automobiles, newly developed tires hereafter requires a rubber which can provide a cross-linked rubber excellent in low heat buildup, wet grip, and operation stability than those of conventional rubber such as the rubber disclosed in Patent Document 1.

The present invention has been accomplished in view of the above problems, and aims to provide a method for producing a conjugated diene rubber that can provide a cross-linked rubber excellent in low heat buildup, wet grip, and operation stability.

Means for Solving Problems

As a result of extensive studies to achieve the above object, the present inventors have found that a cross-linked rubber excellent in low heat buildup, wet grip, and operation stability can be obtained by using a conjugated diene rubber obtained by reacting a conjugated diene polymer chain having an active end, which is obtained by polymerizing a monomer containing a conjugated diene compound and a vinyl compound having a functional group interactive with silica, and siloxane as a modifier, and then reacting the conjugated diene polymer chain with winch the siloxane has been reacted and a hydrocarbyloxysilane compound as a modifier, and thereby the present invention has been accomplished.

That is, the present invention provides a method for producing conjugated diene rubber, comprising:
a first step of obtaining a conjugated diene polymer chain having an active end by polymerizing a monomer comprising a conjugated diene compound and a vinyl compound having a functional group interactive with silica using a polymerization initiator in an inert solvent;
a second step of reacting a siloxane compound with the active end of the conjugated diene polymer chain having the active end; and
a third step of reacting a hydrocarbyloxysilane compound with the conjugated diene polymer chain with which the siloxane compound is reacted that is obtained in the second step.

In the method of production according to the present invention, it is preferable to use polyorganosiloxane represented by the following general formula (1) as the siloxane compound.

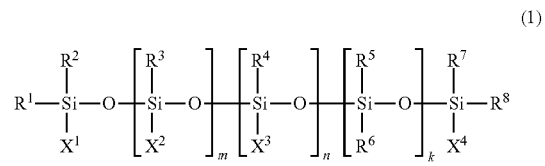

(1)

In the general formula (1) above, $R^4$ to $R^8$ are an alkyl group having 1 to 6 carbon atoms, or an aryl group having 6 to 12 carbon atoms, these may be the same or may be different from each other; $X^2$ and $X^4$ are any group selected from the group consisting of an alkyl group having 1 to 6 carbon atoms, aryl group having 6 to 12 carbon atoms, alkoxy group having 1 to 5 carbon atoms, and epoxy-group containing group having 4 to 12 carbon atoms, these may be the same or may be different from each other; $X^2$ is an alkoxy group having 1 to 5 carbon atoms, or an epoxy-group containing group having 4 to 12 carbon atoms, and when there are a plural number of $X^2$, they may be the same or may be different from each other; $X^3$ is a group containing 2 to 20 repeating units of alkylene glycol, and when there are a plural number of $X^3$, they may be the same or may be different from each other; and "m" is an integer of 1 to 200, "n" is an integer of 0 to 200, "k" is an integer of 0 to 200, and m+n+k is 1 or more.

In the method of production according to the present invention, it is preferable that the vinyl compound having the functional group interactive with the silica is a compound represented by the following general formula (2).

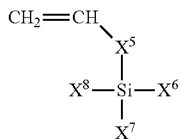

(2)

In the general formula (2) above, $X^5$ represents a chemical single bond or a hydrocarbylene group, and $X^6$, $X^7$ and $X^8$ each independently represent a substituted amino group, a hydrocarbyloxy group, or a substituted or unsubstituted hydrocarbyl group.

In the method of production according to the present invention, it is preferable that the hydrocarbyloxysilane compound is a hydrocarbyloxysilane compound having a group containing a nitrogen atom.

In the method of production according to the present invention, it is preferable that the group containing the nitrogen atom is a group containing a primary amino group having an active hydrogen atom and/or a secondary amino group having an active hydrogen atom.

In the method of production according to the present invention, it is preferable that the first step comprises:
  a step of polymerizing a monomer (a) containing isoprene using the polymerization initiator in the inert solvent to formula polymer block (A) having an active end; and
  a step of mixing the polymer block (A) having the active end and a monomer (b) containing 1,3-butadiene to continue polymerization reaction, so as to obtain the conjugated diene polymer chain that has an active end and comprises the polymer block (A) and the polymer block (B), and
  the vinyl compound having the functional group interactive with the silica is contained in at least one of the monomer (a) and the monomer (b).

In the method of production according to the present invention, it is preferable that the second step further comprises a step of reacting a modifier containing a nitrogen atom with a part of the active end of the conjugated diene polymer chain having the active end before reacting the siloxane compound with the conjugated diene polymer chain having the active end.

In the method of production according to the present invention, it is preferable that the modifier containing the nitrogen atom is a modifier containing the nitrogen atom and not containing a silicon atom.

In the method of production according to the present invention, it is preferable that the modifier containing the nitrogen atom and not containing the silicon atom is N-substituted cyclic amides.

Further, the present invention provides a conjugated diene rubber obtained by the above-mentioned methods of production.

Furthermore, the present invention provides a rubber composition comprising a rubber ingredient and silica, the rubber ingredient containing the conjugated diene rubber.

It is preferable that the rubber composition according to the present invention further comprises a cross-linking agent.

Further, the present invention provides a cross-linked rubber obtained by cross-linking the rubber composition, and a tire comprising the cross-linked rubber.

Effects of Invention

According to the present invention, it is possible to provide a conjugated diene rubber that can provide a cross-linked rubber excellent in low heat buildup, wet grip, and operation stability; a rubber composition containing the conjugated diene rubber; a cross-linked rubber excellent in the low heat buildup, wet grip, and operation stability that is obtained by cross-linking the rubber composition; and tires comprising the cross-linked rubber.

DESCRIPTION OF EMBODIMENTS

<Method of Production of Conjugated Diene Rubber>

The method for producing conjugated diene rubber according to the present invention comprises:
  a first step of obtaining a conjugated diene polymer chain having an active end by polymerizing a monomer containing a conjugated diene compound and a vinyl compound having a functional group interactive with silica using a polymerization initiator in an inert solvent;
  a second step of reacting a siloxane compound with the active end of the conjugated diene polymer chain having the active end; and
  a third step of reacting a hydrocarbyloxysilane compound with the conjugated diene polymer chain with which the siloxane compound has been reacted that is obtained in the second step.

<First Step>

The first step of the method of production according to the present invention is a step of obtaining a conjugated diene polymer chain having an active end by polymerizing a monomer containing a conjugated diene compound and a vinyl compound having a functional group interactive with silica using a polymerization initiator in an inert solvent.

In the first step of the method of production according to the present invention, the conjugated diene compound used as the monomer to obtain the conjugated diene polymer chain having an active end is not particularly limited, but 1,3-butadiene, isoprene, 2,3-dimethyl-1,3-butadiene, 2-phenyl-1,3-butadiene, 1,3-pentadiene, 2-methyl-1,3-pentadiene, 1,3-hexadiene, 4,5-diethyl-1,3-octadiene, 3-butyl-1,3-octadiene, etc. may be mentioned. Among these as well, 1,3-butadiene and isoprene are preferable. These conjugated diene compounds may be used as single type alone or may be used as two types or more combined.

In the first step of the method of production according to the present invention, the amount of the conjugated diene compound to be used is preferably an amount so that the content ratio of a conjugated diene monomer unit in the conjugated diene polymer chain having the active end obtained in the first step of the method of production according to the present invention becomes 45 to 99.99 wt %, more preferably an amount so that the content ratio becomes 50 to 94.98 wt %, and still more preferably an amount so that the content ratio becomes 55 to 89.97 wt %. By setting the content ratio of the conjugated diene monomer unit within the above range, conjugated diene rubber can be easily produced.

Further, the vinyl compound having a functional group interactive with silica can be any compound having a functional group interactive with silica and a vinyl group. Here, the functional group interactive with silica indicates a functional group which can form a covalent bond between the functional group and the silica surface or can cause an intermolecular force weaker than the covalent bond (such as ion-dipole interaction, dipole-dipole interaction, hydrogen bond, or van der Waals force). Examples of such a functional group interactive with silica include, but should not be limited to, nitrogen atom-containing functional groups, silicon atom-containing functional groups, oxygen atom-containing functional groups, and the like. Among these, silicon atom-containing functional groups are preferred because they are highly interactive with silica. In other words, as the vinyl compound having a functional group interactive with silica, a vinyl compound having a silicon atom-containing functional group is preferably used. As a result of using a vinyl compound having a silicon atom-containing functional group, a unit of the vinyl compound having a silicon atom-containing functional group are introduced in the conjugated diene rubber.

The vinyl compound having the functional group interactive with silica is not particularly limited, but in view of further enhancing low heat buildup, wet grip and operation stability, a vinyl compound having a silicon atom-containing functional group represented by the following general formula (2) is preferable.

In the general formula (2) above, $X^5$ represents a chemical single bond or a hydrocarbylene group, and $X^6$, $X^7$ and $X^8$ each independently represent a substituted amino group, a hydrocarbyloxy group, or a substituted or unsubstituted hydrocarbyl group.

In the first step of the method of production according to the present invention, by using the vinyl compound having the silicon atom-containing functional group represented by the general formula (2) above as the vinyl compound having the functional group interactive with silica, a monomer unit represented by the following general formula (3) can be introduced into the conjugated diene polymer chain having the active end.

In the general formula (3) above, $X^9$ represents a chemical single bond or a hydrocarbylene group, and $X^{10}$, $X^{11}$ and $X^{12}$ each independently represents a hydroxyl group, a substituted amino group, a hydrocarbyloxy group, or a substituted or unsubstituted hydrocarbyl group.

Note that, $X^9$ in the unit represented by the general formula (3) corresponds to $X^5$ in the compound represented by the general formula (2) $X^{10}$, $X^{11}$, and $X^{12}$ in the unit represented by the general formula (3) correspond to $X^6$, $X^7$, and $X^8$ in the compound represented by the general formula (2), respectively. For this reason, $X^9$, $X^{10}$, $X^{11}$, and $X^{12}$ in the unit represented by the general formula (3) may be the same as $X^5$, $X^6$, $X^7$, and $X^8$ in the compound represented by the general formula (2). In addition, when a compound represented by the general formula (2) where at least one of $X^6$, $X^7$, and $X^8$ is a substituted amino group or a hydrocarbyloxy group is used, at least one of $X^6$, $X^7$, and $X^8$ can be converted to a hydroxyl group as a result of hydrolysis of the substituted amino group or the hydrocarbyloxy group at any timing in any step.

In the general formula (2), $X^5$ is a chemical single bond or a hydrocarbylene group, preferably a chemical single bond. Examples of the hydrocarbylene group include alkylene, alkenediyl, and arylene groups, groups of arylene groups bonded to alkylene groups, and the like.

Examples of the alkylene groups include a methylene group, an ethylene group, a trimethylene group, and the like. Examples of the alkenediyl groups include a vinylene group, an ethylene-1,1-diyl group, and the like. Examples of the arylene groups include a phenylene group, a naphthylene group, a biphenylene group, and the like. Examples of the groups of arylene groups bonded to alkylene groups include a group of a phenylene group bonded to a methylene group, a group of a phenylene group bonded to an ethylene group, and the like. When $X^5$ is the hydrocarbylene group, $X^5$ is preferably an arylene group, more preferably a phenylene group.

In the general formula (2), $X^6$, $X^7$, and $X^8$ each independently represent a substituted amino group, a hydrocarbyloxy group, or a substituted or unsubstituted hydrocarbyl group. It is preferred that at least one of $X^6$, $X^7$, and $X^8$ be the substituted amino group, and it is more preferred that two of $X^6$, $X^7$, and $X^8$ be the substituted amino groups.

A suitable substituted amino group which can form $X^6$, $X^7$, and $X^8$ is a group represented by the following general formula (4).

In the general formula (4) above, $R^9$ and $R^{10}$ may or may not be bonded to each other; when $R^9$ and $R^{10}$ are not bonded to each other, $R^9$ and $R^{10}$ each independently represent a substituted or unsubstituted hydrocarbyl group or a trihydrocarbylsilyl group; when $R^9$ and $R^{10}$ are bonded to each other, $R^9$ and $R^{10}$ represent a hydrocarbylene group optionally containing a nitrogen atom and/or an oxygen atom.

Examples of the hydrocarbyl group which can form $R^9$ and $R^{10}$ include linear alkyl groups such as a methyl group, an ethyl group, a n-propyl group, an isopropyl group, a n-butyl group, an isobutyl group, a sec-butyl group, a tert-butyl group, a n-pentyl group, a n-hexyl group, and a n-octyl group; cyclic alkyl groups such as a cyclopentyl group and a cyclohexyl group; aryl groups such as a phenyl group, a benzyl group, and a naphthyl group; and the like. Among these, the linear alkyl groups are preferred, and the methyl group or the ethyl group is more preferred.

When the hydrocarbyl group which can form $R^9$ and $R^{10}$ has a substituent, examples thereof include hydrocarbyl groups having a hydrocarbyloxy group as a substituent. Examples of the hydrocarbyl groups having a hydrocarbyloxy group as a substituent include alkoxyalkyl groups such as a methoxymethyl group, an ethoxymethyl group, and a methoxyethyl group; aryloxyalkyl groups such as a phenoxymethyl group; and the like.

Specific examples of the trihydrocarbylsilyl group which can form $R^9$ and $R^{10}$ include trialkylsilyl groups such as a trimethylsilyl group, a triethylsilyl group, a tert-butyldimethylsilyl group, and the like.

When $R^9$ and $R^{10}$ are bonded to each other, examples of the hydrocarbylene group which can form $R^9$ and $R^{10}$ include alkylene groups such as a trimethylene group, a tetramethylene group, a pentamethylene group, a hexamethylene group, a heptamethylene group, an octamethylene group, a decamethylene group, a dodecamethylene group, and a 2,2,4-trimethylhexane-1,6-diyl group; alkenediyl groups such as a pentan-2-ene-1,5-diyl group; and the like. When the hydrocarbylene group that can form $R^9$ and $R^{10}$ contains a nitrogen atom and/or an oxygen atom, examples of the hydrocarbylene group containing a nitrogen atom and/or an oxygen atom include a group represented by —CH=N—CH=CH—, a group represented by —CH=N—CH$_2$—CH$_2$—, a group represented by —CH$_2$—CH$_2$—O—CH$_2$—CH$_2$—, and the like.

Preferably, $R^9$ and $R^{10}$ are an alkyl group or are bonded to each other to form an alkylene group. $R^9$ and $R^{10}$ are more preferably an alkyl group. $R^9$ and $R^{10}$ are still more preferably a methyl group or an ethyl group.

In the general formula (4), when $R^9$ and $R^{10}$ are hydrocarbyl groups, specific examples of the group represented by the general formula (4) include dialkylamino groups such as a dimethylamino group, a diethylamino group, an ethylmethylamino group, a di-n-propylamino group, a diisopropylamino group, a di-n-butylamino group, a diisobutylamino group, a di-sec-butylamino group, and a di-tert-butylamino group; diarylamino groups such as a diphenylamino group; and the like. Among these, the dialkylamino groups are preferred, and the dimethylamino group, the diethylamino group, and the di-n-butylamino group are more preferred.

In the general formula (4), when $R^9$ and $R^{10}$ each are a hydrocarbyl group having a hydrocarbyloxy group as a substituent, specific examples of the group represented by the general formula (4) include di(alkoxyalkyl)amino groups such as a di(methoxymethyl)amino group and a di(ethoxymethyl)amino group, and the like.

When $R^9$ and $R^{10}$ in the general formula (4) are trihydrocarbylsilyl groups, specific examples of the group represented by the general formula (4) include trialkylsilyl group-containing amino groups such as a bis(trimethylsilyl)amino group, a bis(tert-butyldimethylsilyl) amino group, and a N-trimethylsilyl-N-methylamino group, and the like.

When $R^9$ and $R^{10}$ in the general formula (4) are bonded to each other to form a hydrocarbylene group, specific examples of the group represented by the general formula (4) include 1-alkyleneimino groups such as a 1-trimethyleneimino group, a 1-pyrrolidino group, a 1-piperidino group, a 1-hexamethyleneimino group, a 1-heptamethyleneimino group, a 1-octamethyleneimino group, a 1-decamethyleneimino group, and a 1-dodecamethyleneimino group, and the like.

When $R^9$ and $R^{10}$ in the general formula (4) are bonded to each other to form a hydrocarbylene group containing a nitrogen atom and/or an oxygen atom, specific examples of the group represented by the general formula (4) include a 1-imidazolyl group, a 4,5-dihydro-1-imidazolyl group, a morpholino group, and the like.

The group represented by the general formula (4) is preferably a dialkylamino group and a 1-alkyleneimino group. More preferred are dialkylamino groups, and still more preferred are a dimethylamino group, a diethylamino group, and a di-n-butylamino group.

Examples of the hydrocarbyloxy group that can form $X^6$, $X^7$, and $X^8$ in the general formula (2) include alkoxy groups such as a methoxy group, an ethoxy group, a n-propoxy group, an isopropoxy group, a n-butoxy group, a sec-butoxy group, and a tert-butoxy group; aryloxy groups such as a phenoxy and a benzyloxy group; and the like.

Examples of the hydrocarbyl group that can form $X^6$, $X^7$, and $X^8$ in the general formula (2) include alkyl groups such as a methyl group, an ethyl group, a n-propyl group, an isopropyl group, a n-butyl group, a sec-butyl group, and a tert-butyl group; aryl groups such as a phenyl group, a 4-methyl-1-phenyl group, and a benzyl group; and the like.

When the hydrocarbyl group that can form $X^6$, $X^7$, and $X^8$ has a substituent, examples thereof include hydrocarbyl groups having a hydrocarbyloxy group as a substituent. Examples thereof include alkoxyalkyl groups such as a methoxymethyl group, an ethoxymethyl group, and an ethoxyethyl group, and the like.

When in the general formula (2), $X^5$ is a chemical single bond and one of $X^6$, $X^7$, and $X^8$ is a substituted amino group, specific examples of the vinyl compound containing a silicon atom-containing functional group represented by the general formula (2) include (dialkylamino)dialkylvinylsilanes such as (dimethylamino)dimethylvinylsilane, (ethylmethylamino)dimethylvinylsilane, (di-n-propylamino)dimethylvinylsilane, (diisopropylamino)dimethylvinylsilane, (dimethylamino)diethylvinylsilane, (ethylmethylamino)diethylvinylsilane, (di-n-propylamino)diethylvinylsilane, and (diisopropylamino)diethylvinylsilane; [bis(trialkylsilyl)amino]dialkylvinylsilanes such as [bis(trimethylsilyl)amino]dimethylvinylsilane, [bis(t-butyldimethylsilyl)amino]dimethylvinylsilane, [bis(trimethylsilyl)amino]diethylvinylsilane, and [bis(t-butyldimethylsilyl)amino]diethylvinylsilane; (dialkylamino)di(alkoxy alkyl)vinylsilanes such as (dimethylamino)di(methoxymethyl)vinylsilane, (dimethylamino)di(methoxyethyl)vinylsilane, (dimethylamino)di(ethoxymethyl)vinylsilane, (dimethylamino)di(ethoxyethyl)vinylsilane, (diethylamino)di(methoxymethyl)vinylsilane, (diethylamino)di(methoxyethyl)vinylsilane, (diethylamino)di(ethoxymethyl) vinylsilane, and (diethylamino)di(ethoxyethyl)vinylsilane; cyclic aminodialkylvinylsilane compounds such as pyrrolidinodimethylvinylsilane, piperidinodimethylvinylsilane, hexamethyleneiminodimethylvinylsilane, 4,5-dihydroimidazolyldimethylvinylsilane, and morpholinodimethylvinylsilane; and the like.

When in the general formula (2), $X^5$ is a hydrocarbylene group and one of $X^6$, $X^7$, and $X^8$ is a substituted amino group, specific examples of the vinyl compound containing a silicon atom-containing functional group represented by the general formula (2) include (dialkylamino)dialkylvinylphenylsilanes such as (dimethylamino)dimethyl-4-vinylphenylsilane, (dimethylamino)dimethyl-3-vinylphenylsilane, (diethylamino)dimethyl-4-vinylphenylsilane, (diethylamino)dimethyl-3-vinylphenylsilane, (di-n-propylamino)dimethyl-4-vinylphenylsilane, (di-n-propylamino)dimethyl-3-vinylphenylsilane, (di-n-butylamino)dimethyl-4-vinylphenylsilane, (di-n-butylamino)dimethyl-3-vinylphenylsilane, (dimethylamino)diethyl-4-vinylphenylsilane, (dimethylamino)diethyl-3-vinylphenylsilane, (diethylamino)diethyl-4-vinylphenylsilane, (diethylamino)diethyl-3-vinylphenylsilane, (di-n-propylamino)diethyl-4-vinylphenylsilane, (di-n-propylamino)diethyl-3-vinylphenylsilane, (di-n-butylamino)diethyl-4-vinylphenylsilane, and (di-n-butylamino)diethyl-3-vinylphenylsilane, and the like.

When in the general formula (2), $X^5$ is a chemical single bond and two of $X^6$, $X^7$, and $X^8$ are substituted amino groups, specific examples of the vinyl compound containing a silicon atom-containing functional group represented by the general formula (2) include bis(dialkylamino)alkylvinylsilanes such as bis(dimethylamino)methylvinylsilane, bis(diethylamino)methylvinylsilane, bis(di-n-propylamino)methylvinylsilane, bis(di-n-butylamino)methylvinylsilane, bis(dimethylamino)ethylvinylsilane, bis(diethylamino)ethylvinylsilane, bis(di-n-propylamino)ethylvinylsilane, and bis(di-n-butylamino)ethylvinylsilane; bis[bis(trialkylsilyl)amino]alkylvinylsilanes such as bis[bis(trimethylsilyl)amino]methylvinylsilane, bis[bis(tert-butyldimethylsilyl)amino]methylvinylsilane, bis[bis(trimethylsilyl)amino]ethylvinylsilane, and bis[bis(tert-butyldimethylsilyl)amino]ethylvinylsilane; bis(dialkylamino)alkoxyalkylsilanes such as bis(dimethylamino)methoxymethylvinylsilane, bis(dimethylamino)methoxyethylvinylsilane, bis(dimethylamino)ethoxymethylvinylsilane, bis(dimethylamino)ethoxyethylvinylsilane, bis(diethylamino)methoxymethylvinylsilane, bis(diethylamino)methoxyethylvinylsilane, bis(diethylamino)ethoxymethylvinylsilane, and bis(dimethylamino)ethoxyethylvinylsilane; bis(cyclic amino)alkylvinylsilane compounds such as bis(pyrrolidino)methylvinylsilane, bis(piperidino)methylvinylsilane, bis(hexamethyleneimino)methylvinylsilane, bis(4,5-dihydroimidazolyl)methylvinylsilane, and bis(moipholino)methylvinylsilane; and the like.

When in the general formula (2), $X^5$ is a hydrocarbylene group and one of $X^6$, $X^7$, and $X^8$ is a substituted amino group, specific examples of the vinyl compound containing a silicon atom-containing functional group represented by the general formula (2) include bis(dialkylamino)alkylvinylphenylsilanes such as bis(dimethylamino)methyl-4-vinylphenylsilane, bis(dimethylamino)methyl-3-vinylphenylsilane, bis(diethylamino)methyl-4-vinylphenylsilane, bis(diethylamino)methyl-3-vinylphenylsilane, bis(di-n-propylamino)methyl-4-vinylphenylsilane, bis(di-n-propylamino)methyl-3-vinylphenylsilane, bis(di-n-butylamino)methyl-4-vinylphenylsilane, bis(di-n-butylamino)methyl-3-vinylphenylsilane, bis(dimethylamino)ethyl-4-vinylphenylsilane, bis(dimethylamino)ethyl-3-vinylphenylsilane, bis(diethylamino)ethyl-4-vinylphenylsilane, bis(diethylamino)ethyl-3-vinylphenylsilane, bis(di-n-propylamino)ethyl-4-vinylphenylsilane, bis(di-n-propylamino)ethyl-3-vinylphenylsilane, bis(di-n-butylamino)ethyl-4-vinylphenylsilane, and bis(di-n-butylamino)ethyl-3-vinylphenylsilane, and the like.

When in the general formula (2), $X^5$ is a chemical single bond and three of $X^6$, $X^7$, and $X^8$ are substituted amino groups, specific examples of the vinyl compound containing a silicon atom-containing functional group represented by the general formula (2) include tris(dialkylamino)vinylsilanes such as tris(dimethylamino)vinylsilane, tris(diethylamino)vinylsilane, tris(di-n-propylamino)vinylsilane, and tris(di-n-butylamino)vinylsilane, and the like.

When in the general formula (2), $X^5$ is a hydrocarbylene group and three of $X^6$, $X^7$, and $X^8$ are substituted amino groups, specific examples of the vinyl compound containing a silicon atom-containing functional group represented by the general formula (2) include tris(dialkylamino)vinylphenylsilanes such as tris(dimethylamino)-4-vinylphenylsilane, tris(dimethylamino)-3-vinylphenylsilane, tris(diethylamino)-4-vinylphenylsilane, tris(diethylamino)-3-vinylphenylsilane, tris(di-n-propylamino)-4-vinylphenylsilane, tris(di-n-propylamino)-3-vinylphenylsilane, tris(di-n-butylamino)-4-vinylphenylsilane, and tris(di-n-butylamino)-3-vinylphenylsilane, and the like.

When in the general formula (2), $X^5$ is a chemical single bond and none of $X^6$, $X^7$, and $X^8$ is a substituted amino group, specific examples of the vinyl compound containing a silicon atom-containing functional group represented by the general formula (2) include trialkoxyvinylsilanes such as trimethoxyvinylsilane, triethoxyvinylsilane, and tripropoxyvinylsilane; dialkoxyalkylvinylsilanes such as methyldimethoxyvinylsilane and methyldiethoxyvinylsilane; dialkoxyarylvinylsilanes such as di(tert-pentoxy)phenylvinylsilane and di(tert-butoxy)phenylvinylsilane; monoalkoxydialkylvinylsilanes such as dimethylmethoxyvinylsilane; monoalkoxydiarylvinylsilanes such as tert-butoxydiphenylvinylsilane and tert-pentoxydiphenylvinylsilane; monoalkoxyalkylarylvinylsilanes such as tert-butoxymethylphenylvinylsilane and tert-butoxyethylphenylvinylsilane; substituted alkoxyvinylsilane compounds such as tris(β-methoxyethoxy)vinylsilane; and the like.

Among these compounds represented by the general formula (2), preferred are those where $X^5$ is a chemical single bond, and more preferred are those where $X^5$ is a chemical single bond and two of $X^6$, $X^7$, and $X^8$ are substituted amino groups. Particularly preferred are those where $X^5$ is a chemical single bond and two of $X^6$, $X^7$, and $X^8$ are dialkylamino groups.

Among these compounds represented by the general formula (2), preferred are bis(dimethylamino)methylvinylsilane, bis(diethylamino)methylvinylsilane, and bis(di-n-butylamino)methylvinylsilane, and particularly preferred is bis(diethylamino)methylvinylsilane.

Further, as the vinyl compound having the functional group interactive with silica other than the compound represented by the general formula (2) above, bis(trialkylsilyl)aminostyrene such as 4-N,N-bis(trimethylsilyl)aminostyrene and 3-N,N-bis(trimethylsilyl)aminostyrene; bis(trialkylsilyl)aminoalkylstyrenes such as 4-bis(trimethylsilyl)aminomethylstyrene, 3-bis(trimethylsilyl)aminomethylstyrene, 4-bis(trimethylsilyl)aminoethylstyrene, 3-bis(trimethylsilyl)aminoethylstyrene; dialkylaminostyrene such as 3-dimethylaminostyrene, 3-diethylaminostyrene, 3-dipropylaminostyrene, 3-dibutylaminostyrene, 3-diallylaminostyrene, 4-dimethylaminostyrene, 4-diethylaminostyrene, 4-dipropylaminostyrene, 4-dibutylaminostyrene, 4-diallylaminostyrene; dialkylaminoalkylstyrene such as 4-N,N-dimethylaminomethylstyrene, 4-N,N-diethylaminomethylstyrene, 4-N,N-di-n-propylaminoethylstyrene, 4-N,N-di-n-butylaminoethylstyrene, 4-N,N-dimethylaminoethylstyrene, 4-N,N-diethylaminoethylstyrene, 4-N,N-di-n-propylaminoethylstyrene, 4-N,N-di-n-butylaminoethylstyrene; and the like may be mentioned.

In the first step of the method of production according to the present invention, the amount of the vinyl compound having the functional group interactive with silica to be used is preferably an amount so that the content ratio of a unit of vinyl compound having the functional group interactive with silica in the conjugated diene polymer chain having the active end obtained in the first step of the method of production according to the present invention becomes 0.01 to 20 wt %, more preferably an amount so that the content ratio becomes 0.02 to 2 wt %, and still more preferably an amount so that the content ratio becomes 0.03 to 1 wt %. By setting the content ratio of the unit of vinyl compound having the functional group interactive with silica within the above range, it is possible to make the effect of improving low heat buildup, wet grip, and operation stability more remarkable.

In addition, in the first step of the method of production according to the present invention, it is preferable to use an aromatic vinyl compound together with the conjugated diene compound and the vinyl compound having the functional group interactive with silica as the monomer used for the polymerization from the viewpoint that the low heat buildup and wet grip can be further increased when the obtained conjugated diene rubber is famed to the cross-linked rubber. Examples of the aromatic vinyl compound include styrene, methylstyrene, ethylstyrene, t-butylstyrene, α-methylstyrene, α-methyl-p-methylstyrene, crolstyrene, bromostyrene, methoxystyrene, dimethylaminomethylstyrene, dimethylaminoethylstyrene, diethylaminomethylstyrene, diethylaminoethylstyrene, cyanoethylstyrene, vinylnaphthalene, and the like. Among these, styrene is preferred.

In the first step of the method of production according to the present invention, the amount of the aromatic vinyl compound to be used is preferably an amount so that the content ratio of an aromatic vinyl monomer unit in the conjugated diene polymer chain having the active end obtained in the first step of the method of production according to the present invention becomes 54.99 wt % or less, more preferably an amount so that the content ratio becomes 5 to 49.98 wt %, and still more preferably an amount so that the content ratio becomes 10 to 44.97 wt %. By setting the content ratio of the aromatic vinyl monomer unit within the above range, it is possible to further enhance the low heat buildup, wet grip, and operation stability.

In addition, in the first step of the method of production according to the present invention, together with the conjugated diene compound and the vinyl compound having the functional group interactive with silica, a compound, which is copolymerizable with the conjugated diene compound and the vinyl compound having the functional group interactive with silica, other than the aromatic vinyl compound may be used. Examples of such copolymerizable compound include chain olefin compounds such as ethylene, propylene and 1-butene; cyclic olefin compounds such as cyclopentene and 2-norbornene; non-conjugated diene compounds such as 1,5-hexadiene, 1,6-heptadiene, 1,7-octadiene, dicyclopentadiene, 5-ethylidene-2-norbornene; (meth)acrylic acid esters such as methyl (meth)acrylate, ethyl (meth)acrylate, and butyl (meth)acrylate; other (meth)acrylic acid derivatives such as (meth)acrylonitrile and (meth)acrylamide; and the like.

In the first step of the method of production according to the present invention, the amount of the copolymerizable compound to be used is preferably an amount so that the content ratio of a copolymerizable compound monomer unit in the conjugated diene polymer chain having the active end obtained in the first step of the method of production according to the present invention becomes 10 wt % or less, more preferably an amount so that the content ratio becomes 5 wt % or less.

The inert solvent used in the polymerization may be any inert solvent that is usually used in solution polymerization and does not inhibit the polymerization reaction. Specific examples of the inert solvent include chain aliphatic hydrocarbons such as butane, pentane, hexane, and heptane; alicyclic hydrocarbons such as cyclopentane and cyclohexane; aromatic hydrocarbons such as benzene, ethylbenzene, toluene, and xylene; ether compounds such as tetrahydrofuran and diethyl ether; and the like. These inert solvents may be used as single type alone or may be used as two types or more combined. Although not particularly limited, the amount of the inert solvent is chosen to provide a monomer concentration of, for example, 1 to 50 wt %, preferably 5 to 40 wt %.

The polymerization initiator used for polymerization is not particularly limited so long as able to cause a monomer containing a conjugated diene compound and a vinyl compound having a functional group interactive with silica to polymerize to give conjugated diene polymer chain having an active end. As specific examples, an organic alkali metal compound, organic alkali earth metal compound, and a polymerization initiator having a lanthanide-series metal compound, etc. as a primary catalyst may be mentioned. As the organic alkali metal compound, for example, organic monolithium compounds such as n-butyllithium, sec-butyllithium, t-butyllithium, hexyllithium, phenyllithium, and stilbenelithium; organic polyvalent lithium compounds such as dilithiomethane, 1,4-dilithiobutane, 1,4-dilithio-2-ethylcyclohexane, 1,3,5-trilithiobenzene, and 1,3,5-tris(lithimethyl)benzene; organic sodium compounds such as sodium naphthalene; organic potassium compounds such as potassium naphthalene; etc. may be mentioned. Further, as the organic alkali earth metal compound, for example, di-n-butylmagnesium, di-n-hexylmagnesium, diethoxycalcium, di-t-butoxystrontium, diethoxybarium, di isopropoxybarium, diethylmercaptobarium, di-t-butoxybarium, diphenoxybarium, diethylaminobarium, diketylbarium, etc. may be mentioned. As the polymerization initiator having a lanthanide series metal compound as a primary catalyst, for example, a polymerization initiator having a salt of a lanthanide series metal comprised of a lanthanide series metal such as lanthanum, cerium, praseodymium, neodymium, samarium, and gadolinium and a carboxylic acid, phosphorus-containing organic acid, etc. as a primary catalyst and comprised of this and a co-catalyst such as an alkylaluminum compound, organic aluminum hydride compound, and organic aluminum halide compound, etc. may be mentioned. Among these polymerization initiators, organic monolithium compound and organic polyvalent lithium compound are preferably used, an organic monolithium compound is more preferably used, and n-butyllithium is particularly preferably used.

Note that, the organic alkali metal compound may be reacted in advance with a secondary amine compound such as dibutylamine, dihexylamine, dibenzylamine, pyrrolidine, piperidine, hexamethyleneimine, and heptamethyleneimine and be used as an organic alkali metal amide compound. By using an organic alkali metal amide compound as the polymerization initiator, a modified structure with a secondary amine compound can be introduced to a polymerization initiating end, thereby the obtained cross-linked rubber can become one more excellent in low heat buildup and wet grip. These polymerization initiators may be used as single type alone or as two or more types combined.

Although the amount of the polymerization initiator to be used is determined according to the target molecular weight of the conjugated diene polymer chain, the amount is in the range of typically 1 to 50 mmol, preferably 1.5 to 20 mmol, more preferably 2 to 15 mmol with respect to 1000 g of the monomers.

The polymerization temperature is in the range of typically −80 to +150° C., preferably 0 to 100° C., more preferably 30 to 90° C. Although the polymerization can be pertained in any manner, that is, in batch or continuously, a batch method is preferably used to copolymerize the conjugated diene compound and the vinyl compound having a functional group interactive with silica as well as the aromatic vinyl compound because the randomness of the bonding sequence of the conjugated diene monomer unit and the aromatic vinyl monomer unit is readily controlled. The bonding sequence of the monomer unit in the conjugated diene polymer chain may be any of a variety of bonding sequences such as block, tapered, and random sequences.

Among these, a random sequence is preferable. A random copolymer can result in a cross-linked rubber having further reduced heat buildup.

In addition, when polymerizing the monomer containing the conjugated diene compound and the vinyl compound having the functional group interactive with silica, a polar compound is preferably added to an inert organic solvent in order to adjust the vinyl bond content in the conjugated diene monomer unit in the obtained conjugated diene polymer chain. Examples of the polar compound include, for example, cyclic ethers such as tetrahydrofuran, tetrahydropyran, 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, diethylene glycol dibutyl ether; aromatic ethers such as diphenyl ether and anisole; tertiary amines such as tetramethylethylenediamine; alkali metal alkoxide; phosphine compounds; and the like. Among these, the ether compounds and the tertiary amines are preferred, and tetrahydrofuran, ethylene glycol dibutyl ether, and ethylene glycol diethyl ether are particularly preferred as the ether compound, and tetramethylethylenediamine is particularly preferred as the tertiary amine. These polar compounds may be used as single type alone or may be used as two types or more combined. The amount of the polar compound to be used is determined according to the target vinyl bond content, and is preferably 0.001 to 100 mol, more preferably 0.01 to 10 mol with respect to 1 mol of the polymerization initiator. When the amount of use of the polar compound is in this range, adjustment of the vinyl bond content in the conjugated diene monomer unit is easy and the problem of deactivation of the polymerization initiator hardly ever arises.

The vinyl bond content in the conjugated diene monomer unit of the conjugated diene polymer chain having an active end obtained in the first step of the method of production according to the present invention is preferably 1 to 90 wt %, more preferably 3 to 80 wt %, particularly preferably 5 to 75 wt %. By making the vinyl bond content in the conjugated diene monomer unit the above range, the obtained cross-linked rubber becomes more excellent in low heat buildup.

The weight average molecular weight (Mw) of the conjugated diene polymer chain having an active end obtained in the first step of the method of production according to the present invention is not particularly limited, but the value measured by gel permeation chromatography in tams of polystyrene standards is preferably 100,000 to 1,000,000, more preferably 150,000 to 900,000, particularly preferably 150,000 to 800,000. By making the weight average molecular weight (Mw) of the conjugated diene polymer chain having an active end the above range, wet grip and low heat buildup of the obtained cross-linked rubber become better balanced.

The molecular weight distribution represented by the ratio (Mw/Mn) of the weight average molecular weight (Mw) and the number average molecular weight (Mn) of the conjugated diene polymer chain having an active end obtained in the first step of the method of production according to the present invention is not particularly limited, but is preferably 1.0 to 3.0, more preferably 1.0 to 2.5. By making the molecular weight distribution (Mw/Mn) of the conjugated diene polymer chain having an active end the above range, the production of the conjugated diene rubber becomes easy.

Further, in the method of production according to the present invention, it is preferable for the first step to be as follows for making the obtained cross-linked rubber more excellent in low heat buildup.

In other words, the method of production preferably comprises: a step of polymerizing a monomer (a) containing isoprene by using a polymerization initiator in an inert solvent to form a polymer block (A) having an active end; and a step of mixing the polymer block (A) having the active end and a monomer (b) containing 1,3-butadiene to continue polymerization reaction, so as to obtain a conjugated diene polymer chain that has an active end and comprises the polymer block (A) and the polymer block (B).

By employing such steps, it is possible to make the conjugated diene polymer chain having the active end obtained by the first step include a polymer chain in which the polymer block (A) containing an isoprene monomer unit and the polymer block (B) containing a 1,3-butadiene monomer unit are famed in a subsequent manner.

In addition, at this time, by using a monomer containing a vinyl compound having a functional group interactive with silica as at least one of the monomer (a) and the monomer (b), for example, by containing the vinyl compound having the functional group interactive with silica in the monomer (a), a unit of the vinyl compound having the functional group interactive with silica can be contained in the polymer block (A). Similarly, by containing the vinyl compound having the functional group interactive with silica in the monomer (b), a unit of the vinyl compound having the functional group interactive with silica can be contained in the polymer block (B).

As the monomer (a) for forming the polymer block (A), any monomer containing isoprene may be used, and a monomer corresponding to the monomer composition of the polymer block (A) to be formed may be used. For example, when the polymer block (A) is composed of an isoprene monomer unit and an aromatic vinyl monomer unit, the monomer (a) may contain isoprene and an aromatic vinyl compound. In addition, when polymer block (A) has a unit of vinyl compound having a functional group interactive with silica in addition to the isoprene monomer unit and the aromatic vinyl monomer unit, the monomer (a) may contain a vinyl compound having the functional group interactive with silica in addition to the isoprene and aromatic vinyl compound.

Hereinafter, such an embodiment is described.

[Polymer Block (A)]

The polymer block (A) in the conjugated diene polymer chain according to an embodiment of the present invention may be any one containing an isoprene monomer unit, and is not particularly limited, and may be composed of only the isoprene monomer unit, or may be composed of the isoprene monomer unit and a monomer unit other than the isoprene monomer unit. In this case, as the monomer unit other than the isoprene monomer unit, an aromatic vinyl monomer unit is suitably mentioned, and the polymer block (A) is preferably one containing the aromatic vinyl monomer unit in addition to the isoprene monomer unit.

In the polymer block (A), the content ratio of the isoprene monomer unit is preferably 50 wt % or more, more preferably 70 wt % or more, and still more preferably 90 wt % or more. Further, the upper limit of the content ratio of the isoprene monomer unit is not particularly limited, but is preferably 99 wt % or less. By setting the content ratio of the isoprene monomer unit in the polymer block (A) within the above range, when a compounding agent such as silica is blended into the conjugated diene rubber, the compatibility between the conjugated diene rubber and the compounding agent such as silica can be further increased, and thereby, the obtained cross-linked rubber can be made more excellent in low heat buildup and wet grip.

As the aromatic vinyl compound used for forming the aromatic vinyl monomer unit contained in the polymer block (A), the same as those illustrated above as aromatic vinyl compounds can be used. Among these as well, styrene is preferable. Note that these aromatic vinyl compounds may be used as single type alone or may be used as two types or more combined. In polymer block (A), the content ratio of the aromatic vinyl monomer unit is preferably 50 wt % or less, more preferably 30 wt % or less, and still more preferably 10 wt % or less. Further, the lower limit of the content ratio of the aromatic vinyl monomer unit is not particularly limited, but is preferably 1 wt % or more.

In addition, in the method of production according to an embodiment of the present invention, at least one of the polymer block (A) and the polymer block (B) to be described later that comprise the conjugated diene polymer chain may contain a unit of the vinyl compound having the functional group interactive with silica, but, for example, may be any one of an aspect in which such unit of the vinyl compound having the functional group interactive with silica is contained only in the polymer block (A); an aspect in which the unit of the vinyl compound is contained only in the polymer block (B); and an aspect in which the unit of the vinyl compound is contained in both the polymer block (A) and polymer block (B).

In any case of the unit of the vinyl compound having the functional group interactive with silica being contained in the polymer block (A), in the polymer block (B) and in both of them, the content ratio of the unit of the vinyl compound having the functional group interactive with silica is adjusted to be preferably in the range of 0.01 to 20 wt %, more preferably in the range of 0.02 to 2 wt %, and particularly in the range of 0.03 to 1 wt % with respect to the total monomer units constituting the conjugated diene rubber. By setting the content ratio of the unit of the vinyl compound having the functional group interactive with silica within the above range, it is possible to make the effect of improving the low heat buildup, wet grip, and operation stability more remarkable.

The polymer block (A) may contain other monomer unit as necessary in addition to the isoprene monomer unit as well as the aromatic vinyl monomer unit and the unit of the vinyl compound having the functional group interactive with the silica, which are optionally contained. The other compounds used to constitute the other monomer unit include chain olefin compounds such as ethylene, propylene and 1-butene; cyclic olefin compounds such as cyclopentene and 2-norbornene; conjugated diene compounds other than isoprene such as 1,3-butadiene, 2,3-dimethyl-1,3-butadiene, 2-chloro-1,3-butadiene, 1,3-pentadiene, and 1,3-hexadiene; non-conjugated diene compounds such as 1,5-hexadiene, 1,6-heptadiene, 1,7-octadiene, dicyclopentadiene, and 5-ethylidene-2-norbornene; and the like. These other monomers may be used as single type alone or as two or more types combined. In the polymer block (A), the content ratio of the other monomer unit is preferably 20 wt % or less, more preferably 10 wt % or less, further preferably 6 wt % or less.

In the method of production according to an embodiment of the present invention, the polymer block (A) in the conjugated diene polymer chain is famed by polymerizing a monomer (a) containing isoprene using a polymerization initiator in an inert solvent. As a result, the famed polymer block (A) has an active end.

For forming the polymer block (A), as the inert solvent used for polymerizing the monomer, the same as those illustrated above as inert solvents can be used. The amount of use of the inert solvent is an amount in which the monomer concentration becomes preferably 1 to 80 wt %, preferably 10 to 50 wt %.

The polymerization initiator used for foiling the polymer block (A) is not particularly limited so long as one able to polymerize the monomer (a) containing isoprene, and give a polymer chain having an active end. As specific examples thereof, the same as those illustrated above as the polymerization initiator can be used.

The amount of use of the polymerization initiator may be determined in accordance with the targeted molecular weight, but is preferably in the range of 4 to 250 mmol, more preferably 6 to 200 mmol, particularly preferably 10 to 70 mmol, with respect to 100 g of the monomer (a) containing isoprene.

The polymerization temperature when polymerizing the monomer (a) containing isoprene is preferably in the range of −80 to +150° C., more preferably 0 to 100° C., further preferably 20 to 90° C. As the polymerization process, a batch process, continuous process, or any other process can be employed. Additionally, the type of bond between each monomer when making the polymer block (A) a copolymer chain may, for example, be made various types of bonds such as a block type, taper type, and random type.

Further, in the method of production according to an embodiment of the present invention, to adjust the vinyl bond content in the isoprene monomer unit in the polymer block (A), it is preferable to add a polar compound to the inert solvent when polymerizing. As the polar compound, the same as those illustrated above as polar compounds can be used. The amount of use of the polar compound may be determined in accordance with the targeted vinyl bond content and is preferably 0.01 to 30 mol with respect to 1 mol of the polymerization initiator, more preferably 0.05 to 10 mol. When the amount of use of the polar compound is in the above range, adjustment of the vinyl bond content in the isoprene monomer unit is easy and the problem of deactivation of the polymerization initiator hardly ever arises. Additionally, the vinyl bond content in the isoprene monomer unit can be increased by increasing the amount of use of the polar compound within the above range.

The vinyl bond content in the isoprene monomer unit in the polymer block (A) is preferably 5 to 90 wt %, more preferably 5 to 80 wt %. By making the vinyl bond content in the isoprene monomer unit within the above range, low heat buildup of the obtained cross-linked rubber can be more enhanced. Note that, in the present Description, the vinyl bond content in the isoprene monomer unit refers to the ratio of total amount of 1,2-structured isoprene monomer unit and 3,4-structured isoprene monomer unit in the isoprene monomer unit.

The weight average molecular weight (Mw) of the polymer block (A) is in the range of 1,000 to 30,000, preferably in the range of 1,500 to 20,000, and more preferably in the range of 2,000 to 10,000. By setting the weight average molecular weight (Mw) of the polymer block (A) within the above range, it is possible to further enhance the effect of improving low heat buildup.

Further, the molecular weight distribution represented by the ratio (Mw/Mn) of the weight average molecular weight (Mw) and the number average molecular weight (Mn) of the polymer block (A) is preferably 1.0 to 1.5, more preferably 1.0 to 1.3. When a value (Mw/Mn) of the molecular weight distribution of the polymer block (A) is within the above range, the production of the conjugated diene rubber becomes easy. Note that, the weight average molecular weight (Mw) and the number average molecular weight (Mn) of the polymer block (A) can be determined as a value measured by gel permeation chromatography in terms of polystyrene standards.

[Polymer Block (B)]

The polymer block (B) in the conjugated diene polymer chain according to an embodiment of the present invention may be any containing the 1,3-butadiene monomer unit, and is not particularly limited, and may be composed of only the 1,3-butadiene monomer unit, or may be composed of the 1,3-butadiene monomer unit and a monomer unit other than the 1,3-butadiene monomer unit. In this case, as the monomer unit other than the 1,3-butadiene monomer unit, the aromatic vinyl monomer unit is suitably mentioned, and the polymer block (B) is preferably one containing the aromatic vinyl monomer unit in addition to the 1,3-butadiene monomer unit.

In the polymer block (B), the content ratio of the 1,3-butadiene monomer unit is preferably 45 wt % or more, more preferably 50 to 94.98 wt %, and still more preferably 55 to 89.97 wt %. By setting the content ratio of the 1,3-butadiene monomer unit in the polymer block (B) within the above range, it is possible to produce the conjugated diene rubber easily.

As the aromatic vinyl compound used for forming the aromatic vinyl monomer unit contained in the polymer block (B), the same as those illustrated above as aromatic vinyl compounds can be used, and among these as well, styrene is preferable. The content of the aromatic vinyl monomer unit is preferably 54.99 wt % or less, more preferably 5 to 49.98 wt %, still more preferably 10 to 44.97 wt %.

In addition, in the method of production according to an embodiment of the present invention, the unit of the vinyl compound having the functional group interactive with silica may be contained in at least one of the polymer block (A) and the polymer block (B) constituting the conjugated diene polymer chain. Thus, an embodiment of the present invention may include the polymer block (B) in which the unit of the vinyl compound having the functional group interactive with silica is contained. In the method of production according to an embodiment of the present invention, from the viewpoint that the obtained cross-linked rubber is excellent in the low heat buildup and wet grip, it is preferable that at least the polymer block (B) contains the unit of the vinyl compound having the functional group interactive with silica. When the unit of the vinyl compound having the functional group interactive with silica is contained in the polymer block (B), the content ratio thereof with respect to the total monomer units constituting the conjugated diene rubber may be such that the content ratio falls within the above range. In the polymer block (B), the content ratio of the unit of the vinyl compound having the functional group interactive with silica is preferably in the range of 0.01 to 20 wt %, more preferably in the range of 0.02 to 2 wt %, and particularly preferably in the range of 0.03 to 1 wt %.

The polymer block (B) may contain another monomer unit as necessary in addition to the 1,3-butadiene monomer unit as well as the aromatic vinyl monomer unit and the unit of the vinyl compound having the functional group interactive with silica, which are optionally contained. As the other compounds constituting such the other monomer unit, isoprene can be used in addition to the same compounds as those exemplified in the polymer block (A) described above (except for 1,3-butadiene). In the polymer block (B), the content ratio of the other monomer unit is preferably 40 wt % or less, more preferably 35 wt % or less, further preferably 25 wt % or less.

In an embodiment of the present invention, the polymer block (B) in the conjugated diene polymer chain is famed in series with the polymer block (A) by mixing the polymer block (A) having an active end described above and a monomer (b) containing 1,3-butadiene to continue the polymerization reaction. The famed polymer block (B) has an active end. On the other hand, the active end is eliminated from the polymer block (A).

For forming the polymer block (B), as the inert solvent used for polymerizing the polymer block (A) and a monomer (b) containing 1,3-butadiene is not particularly limited, and the same as those illustrated above as inert solvents can be used.

The amount of use of the polymer block (A) having an active end when forming the polymer block (B) may be determined in accordance with the targeted molecular weight, but is preferably in the range of 0.1 to 5 mmol, more preferably 0.15 to 2 mmol, further preferably 0.2 to 1.5 mmol, with respect to 100 g of the monomer (b) containing 1,3-butadiene.

The method of mixing the polymer block (A) and the monomer (b) containing 1,3-butadiene is not particularly limited. The polymer block (A) having an active end may be added to a solution of the monomer (b) containing 1,3-butadiene or the monomer (b) containing 1,3-butadiene may be added to a solution of the polymer block (A) having the active end. In the light of controlling the polymerization, the method of adding the polymer block (A) having the active end to the solution of the monomer (b) containing 1,3-butadiene is preferable.

The polymerization temperature when polymerizing the monomer (b) containing 1,3-butadiene is preferably in the range of −80 to +150° C., more preferably 0 to 100° C., further preferably 20 to 90° C. As the polymerization process, a batch process, continuous process, or any other process can be employed, but when making the polymer block (B) a copolymer chain, the batch process is preferable in the point of facilitating control of the randomness of bonds.

The type of bond between each monomer when making the polymer block (B) a copolymer chain may, for example, be made various types of bonds such as a block type, taper type, and random type, but a random bond type is preferable. By making it a random type, low heat buildup of the obtained cross-linked rubber can be more enhanced.

Further, in an embodiment of the present invention, to adjust the vinyl bond content in the 1,3-butadiene monomer unit in the polymer block (B), it is preferable to add a polar compound to the inert solvent when polymerizing as in adjustment of the vinyl bond content in the isoprene monomer unit in the polymer block (A). However, when a polar compound in an amount sufficient to adjust the vinyl bond content in the 1,3-butadiene monomer unit in the polymer block (B) is added to an inert solvent during preparation of the polymer block (A), a polar compound does not need to be newly added. As the polar compound used for adjusting the vinyl bond content, the same as those illustrated above as polar compounds can be used. The amount of use of the polar compound may be determined in accordance with the targeted vinyl bond content, and the adjustment may be made preferably in the range of 0.01 to 100 mol, more preferably 0.1 to 30 mol, with respect to 1 mol of the polymerization initiator used for the first polymerization reaction (polymerization reaction for forming the first polymer block (A)). When the amount of use of the polar compound is in this range, adjustment of the vinyl bond content in the 1,3-butadiene monomer unit is easy and the problem of deactivation of the polymerization initiator hardly ever arises.

The vinyl bond content in the 1,3-butadiene monomer unit in the polymer block (B) is preferably 1 to 90 wt %, more preferably 3 to 80 wt %, particularly preferably 5 to 75 wt %. By making the vinyl bond content in the 1,3-butadiene monomer unit in the polymer block (B) within this range, the obtained cross-linked rubber can be more excellent in low heat buildup.

In this way, the conjugated diene polymer chain having an active end and containing a polymer block (A) and a polymer block (B) can be obtained. In an embodiment of the present invention, the conjugated polymer chain having an active end is preferably famed by the polymer block (A)-polymer block (B) and has an active end at the end of the polymer block (B) in view of productivity, but may be those having a plurality of the polymer blocks (A) or those further having other polymer blocks. For example, a conjugated diene polymer chain having an active end such as the polymer block (A)-polymer block (B)-polymer block (A), etc. may be mentioned. In this case, an active end is famed at the end of a polymer block (A) famed subsequently to the polymer block (B). When the polymer block (A) is famed at the active end side of the conjugated diene polymer chain, the amount of use of isoprene is preferably 10 to 100 mol, more preferably 15 to 70 mol, and particularly preferably 20 to 35 mol, with respect to 1 mol of the polymerization initiator used for the first polymerization reaction (polymerization reaction for forming the first polymer block (A)).

In the conjugated diene polymer chain having an active end obtained in an embodiment of the present invention, the weight ratio of the polymer block (A) to the polymer block (B) (when a plurality of the polymer blocks (A) and polymer blocks (B) are present, the weight ratio is based on each total amount) is preferably 0.001 to 0.2, more preferably 0.005 to 0.1, particularly preferably 0.01 to 0.05 in terms of (weight of polymer block (A))/(weight of polymer block (B)). By making the weight ratio of the polymer block (A) to the polymer block (B) within the above range, wet grip and low heat buildup of the obtained cross-linked rubber become better balanced.

<Second Step>

The second step of the method of production according to the present invention is a step of reacting a siloxane compound with the conjugated diene polymer chain having the active end obtained in the first step.

The siloxane compound used in the second step of the method of production according to the present invention may be any having a siloxane structure (—Si—O—Si), and is not particularly limited, but an organosiloxane having an organic group in addition to the siloxane structure is preferred, and polyorganosiloxane represented by the following general formula (1) is more preferred.

Note that, in the second step of the method of production according to the present invention, the siloxane compound acts as a modifier for modifying the conjugated diene polymer chain having the active end obtained in the first step.

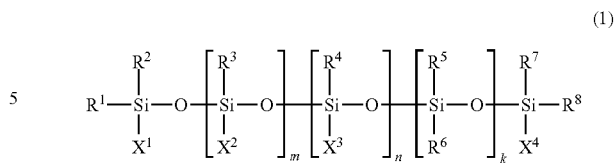

(1)

In the general formula (1) above, $R^2$ to $R^8$ are an alkyl group having 1 to 6 carbon atoms, or an aryl group having 6 to 12 carbon atoms, these may be the same or may be different from each other; $X^2$ and $X^4$ are any group selected from the group consisting of an alkyl group having 1 to 6 carbon atoms, aryl group having 6 to 12 carbon atoms, alkoxy group having 1 to 5 carbon atoms, and epoxy-group containing group having 4 to 12 carbon atoms, these may be the same or may be different from each other; $X^2$ is an alkoxy group having 1 to 5 carbon atoms, or an epoxy-group containing group having 4 to 12 carbon atoms, and when there are a plural number of $X^2$, they may be the same or may be different from each other. $X^3$ is a group containing 2 to 20 repeating units of alkylene glycol, and when there are a plural number of $X^3$, they may be the same or may be different from each other. "m" is an integer of 1 to 200, "n" is an integer of 0 to 200, "k" is an integer of 0 to 200, and m+n+k is 1 or more.

In the polyorganosiloxane represented by the general formula (1) above, as the alkyl group having 1 to 6 carbon atoms which may form $R^2$ to $R^8$, $X^2$ and $X^4$ in the general formula (1) above, for example, methyl group, ethyl group, n-propyl group, isopropyl group, butyl group, pentyl group, hexyl group, cyclohexyl group, etc. may be mentioned. As the aryl group having 6 to 12 carbon atoms, for example, phenyl group, methylphenyl group, etc. may be mentioned. Among these as well, methyl group and ethyl group are preferable in the point of easy production of polyorganosiloxane itself.

Further, in the polyorganosiloxane represented by the general formula (1) above, as the alkoxy group having 1 to 5 carbon atoms which may form $X^2$, $X^2$ and $X^4$, for example, methoxy group, ethoxy group, propoxy group, isopropoxy group, butoxy group, etc. may be mentioned. Among these as well, methoxy group and ethoxy group are preferable in the point of easy production of polyorganosiloxane itself.

Furthermore, in the polyorganosiloxane represented by the general formula (1) above, as the epoxy-group containing group having 4 to 12 carbon atoms which may form $X^1$, $X^2$ and $X^4$, for example, a group represented by the following general formula (6) may be mentioned.

$$-Z^1-Z^2-E \qquad (5)$$

In the general formula (5) above, $Z^1$ represents an alkylene group or alkylarylene group having 1 to 10 carbon atoms, $Z^2$ represents methylene group, sulfur atom or oxygen atom, and E represents a hydrocarbon group having an epoxy group and 2 to 10 carbon atoms.

The group represented by the general formula (5) above is preferably one where $Z^2$ is an oxygen atom, more preferably one where $Z^2$ is an oxygen atom and E is a glycidyl group, particularly preferably one where $Z^1$ is an alkylene group having 1 to 3 carbon atoms, $Z^2$ is an oxygen atom and E is a glycidyl group.

Further, in the polyorganosiloxane represented by the general formula (1) above, $X^1$ and $X^4$ are preferably, of the above, an epoxy-group containing group having 4 to 12 carbon atoms or an alkyl group having 1 to 6 carbon atoms.

Further, $X^2$ is preferably, of the above, epoxy-group containing group having 4 to 12 carbon atoms. Further, it is more preferable that $X^1$ and $X^4$ be an alkyl group having 1 to 6 carbon atoms and $X^2$ be an epoxy-group containing group having 4 to 12 carbon atoms.

Further, in the polyorganosiloxane represented by the general formula (1) above, $X^3$, that is, the group containing repeating units of 2 to 20 alkylene glycol, is preferably a group represented by the following general formula (6).

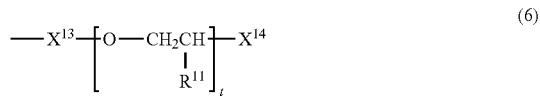

In the general formula (6), "t" is an integer of 2 to 20, $X^{13}$ is an alkylene group or alkylarylene group having 2 to 10 carbon atoms, $R^{11}$ is hydrogen atom or methyl group, and $X^{14}$ is an alkoxy group or aryloxy group having 1 to 10 carbon atoms. Among these as well, one where "t" is an integer of 2 to 8, $X^{13}$ is an alkylene group having 3 carbon atoms, $R^{11}$ is hydrogen atom, and $X^{14}$ is methoxy group.

In the polyorganosiloxane represented by the general formula (1) above, "m" is an integer of 1 to 200, preferably an integer of 20 to 150, and more preferably an integer of 30 to 120. When "m" is 1 to 200, production of the polyorganosiloxane represented by the general formula (1) above becomes easier, and at the same time, its viscosity does not become too high, which makes it easier to handle.

Further, in the polyorganosiloxane represented by the general formula (1) above, "n" is an integer of 0 to 200, preferably an integer of 0 to 150, more preferably an integer of 0 to 120. "k" is an integer of 0 to 200, preferably an integer of 0 to 150, more preferably an integer of 0 to 130. The total number of "m", "n" and "k" is 1 or more, preferably 1 to 400, more preferably 20 to 300, particularly preferably 30 to 250. When the total number of "m", "n" and "k" is 1 or more, the reaction of the polyorganosiloxane represented by the general formula (1) above and the conjugated diene polymer chain having an active end easily proceeds, and further the total number of "m", "n" and "k" is 400 or less, the polyorganosiloxane represented by the general formula (1) above itself is easily produced and the viscosity thereof does not become too high, resulting in easy handling.

In the second step of the method of production according to the present invention, the amount of the siloxane to be used is preferably 0.1 to 10 mol, more preferably 0.2 to 5 mol, still more preferably 0.5 to 2.5 mol, and still more preferably from 1 to 2 mol, in terms of the number of repeating unit of —Si—O— in the siloxane compound, with respect to 1 mol of the active end of the conjugated diene polymer chain having the active end obtained by the first step. When the amount of the siloxane compound to be used is within the above range, the obtained cross-linked rubber has further increased low heat buildup, and among other things, by setting the amount to be used to 1 mol or more in tams of the number of the repeating unit of —Si—O—, substantially all of the active ends of the conjugated diene polymer chain having the active end obtained in the first step can be reacted with the siloxane compound. This enables to properly introduce the modified structure of the hydrocarbyloxysilane compound via the structure derived from the siloxane compound into the conjugated diene polymer chain, and thereby, the low heat buildup, wet grip, and operation stability can be further increased, which is particularly preferred.

The method of making a siloxane compound react with the conjugated diene polymer chain having an active end is not particularly limited, but the method of mixing these in a solvent able to dissolve the same, etc. may be mentioned. As the solvent used at this time, the same as those illustrated as inert solvents used in the first step described above can be used. Further, at this time, the method of adding the siloxane compound to the polymerization solution used for the polymerization for obtaining the conjugated diene polymer chain having an active end is simple and preferable. Further, at this time, the siloxane compound is preferably dissolved in an inert solvent and then added to the polymerization system. The solution concentration is preferably in the range of 1 to 50 wt %. The reaction temperature is not particularly limited, but is usually 0 to 120° C. The reaction time is also not particularly limited, but is usually 1 minute to 1 hour.

The timing for adding the siloxane compound to the solution containing the conjugated diene polymer chain having an active end is not particularly limited, but it is preferable to add the siloxane compound to this solution in the state where the polymerization reaction is not completed and the solution containing the conjugated diene polymer chain having an active end which also contains a monomer, more specifically, in the state where the solution containing the conjugated diene polymer chain having an active end contains 100 ppm or more of monomer, more preferably 300 to 50,000 ppm of monomer. By adding the siloxane compound in this way, it becomes possible to suppress secondary reactions between the conjugated diene polymer chain having an active end and impurities, etc. contained in the polymerization system and to control the reaction well.

According to the second step of the method of production of the present invention, by reacting the active end of the conjugated diene polymer chain having the active end obtained in the above-mentioned first step with the siloxane compound as the modifier, at least a part of the conjugated diene polymer chain forms a new bond between a silicon atom in the siloxane structure and the active end of the conjugated diene polymer chain, and as a result, the siloxane structure is introduced at the end of the conjugated diene polymer chain. In addition, at the same time, the active end represented by —O⁻M⁺ (M is an alkali metal atom, an alkaline earth metal atom, or a lanthanum series metal atom) is famed between an oxygen atom in the siloxane structure and a metal atom which has famed the active end of the conjugated diene polymer chain. Note that, the conjugated diene polymer chain after the reaction, which is obtained in the second step of the method of production according to the present invention, includes one in which a modified structure by the siloxane compound is introduced at the polymer chain ends, but other than that, it may include an unmodified conjugated diene polymer chain that has not been modified by the siloxane compound.

<Third Step>

The third step of the method of production according to the present invention is a step reacting a hydrocarbyloxysilane compound with the conjugated diene polymer chain with which the siloxane compound has been reacted, which is obtained in the above-mentioned second step.

Note that, the conjugated diene polymer chain with which the siloxane compound has been reacted that is used in the third step of the method of production according to the present invention may be any conjugated diene polymer chain that has undergone the above-mentioned second step.

Therefore, such a conjugated diene polymer chain with which the siloxane compound has been reacted may include a conjugated diene polymer chain having an active end to which a modified structure derived from siloxane is introduced, and may include a conjugated diene polymer chain having an unmodified active end that is not modified with the siloxane compound. Furthermore, the conjugated diene polymer chain used in the third step may include a conjugated diene polymer chain in which the active end of the conjugated diene polymer chain having the active end to which a modified structure derived from the siloxane compound is introduced, and which is hydrolyzed to convert the active end to a hydroxyl group. Hereinafter, in the description of the third step, the conjugated diene polymer chain obtained by reacting the siloxane compound is abbreviated as "conjugated diene polymer chain" as appropriate.

In particular, according to the method of production of the present invention, conjugated diene rubber is obtained by reacting a conjugated diene polymer chain having an active end, which is obtained by polymerizing a conjugated diene compound and a vinyl compound having a functional group interactive with silica, with a siloxane compound, and then further reacting a hydrocarbyloxysilane compound. Therefore, the conjugated diene rubber, which can provide a cross-linked rubber having excellent low heat buildup, high wet grip, and high operation stability, can be obtained.

The hydrocarbyloxysilane compound as the modifier used in the third step of the method of production according to the present invention includes silicon-containing compounds having at least one hydrocarbyloxy group which does not correspond to the siloxane compound used in the second step. The hydrocarbyloxysilane compound is preferably a compound having at least one group containing a nitrogen atom in addition to the hydrocarbyloxy group. As the group containing the nitrogen atom, a primary amino group having an active hydrogen atom and/or a secondary amino group having an active hydrogen atom are preferred. In the method of production according to the present invention, the hydrocarbyloxysilane compound acts as the modifier by reacting the hydrocarbyloxy group with the conjugated diene polymer chain having the active end or a reaction residue generated by the reaction of the conjugated diene polymer chain having the active end and the siloxane compound.

Such a hydrocarbyloxysilane compound is not particularly limited, but a compound represented by the following general formula (7) can be suitably used.

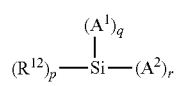

(7)

In the general formula (7) above, $R^{12}$ is the hydrocarbyl group, $A^1$ is the hydrocarbyloxy group, and $A^2$ is a group containing the nitrogen atom, and "p" is an integer of 0 to 2, "q" is an integer of 1 to 3, "r" is an integer of 1 to 3, and p+q+r=4.

$R^{12}$ in the general formula (7) above is the hydrocarbyl group, including, for example, an alkyl group, a cycloalkyl group, an alkenyl group, an aryl group, an aralkyl group, etc., but is preferably an alkyl group having 1 to 6 carbon atoms. As the alkyl group having 1 to 6 carbon atoms, methyl group, ethyl group, n-propyl group, isopropyl group, butyl group, pentyl group, hexyl group, etc. may be mentioned, and among these, methyl group and ethyl group are more preferable.

$A^1$ in the general formula (7) above is the hydrocarbyloxy group, and examples thereof include an alkoxy group such as a methoxy group, an ethoxy group, a n-propoxy group, an isopropoxy group, a n-butoxy group, an isobutoxy group, a sec-butoxy group, and a tert-butoxy group; an alkenyloxy group such as a vinyloxy group and an allyloxy group; an aryloxy group such as a phenoxy group and a naphthoxy group; and an aralkyloxy group such as a benzyloxy group; and the like. Among these, from the viewpoint of reactivity, an alkoxy group and an aryloxy group are preferred, an alkoxy group is more preferred, and a methoxy group and an ethoxy group are particularly preferred.

$A^2$ in the general formula (7) above is a group containing a nitrogen atom, and is not particularly limited as long as it contains a nitrogen atom, but an organic group having a nitrogen atom is preferable, and for example, 3-aminopropyl group, 4-aminobutyl group, 3-(2-aminoethylamino) propyl group, 2-dimethylaminoethyl group, 3-diethylaminopropyl group, 3-diethylaminopropyl group, 3-dipropylaminopropyl group, 3-dibutylaminopropyl group, 3-phenylmethylaminopropyl group, 3-(4-methylpiperazinyl)propyl group, N,N-bis(trimethylsilyl)aminopropyl group, N,N-bis(triethylsilyl)aminopropyl group, N,N',N'-tris(trimethylsilyl)-N-(2-aminoethyl)-3-aminopropyl group, etc. may be mentioned. Among these, groups containing a primary amino group having an active hydrogen atom and/or a secondary amino group having an active hydrogen atom, such as 3-aminopropyl group, 4-aminobutyl group and 3-(2-aminoethylamino)propyl group, are preferable in view of further improvement of low heat buildup and wet grip of the obtained cross-linked rubber. Note that, the "active hydrogen atom" means a hydrogen atom bound to an atom other than a carbon atom, and is preferably a one having binding energy lower than that of the carbon-hydrogen bond of a polymethylene chain.

In the compound represented by the general formula (7) above, "p" is an integer of 0 to 2, "q" is an integer of 1 to 3, "r" is an integer of 1 to 3, p+q+r is 4. In view of reactivity with the conjugated diene polymer chain having an active end and a reaction residue produced by a reaction of the conjugated diene polymer chain having an active end with the siloxane compound, "p", "q" and "r" are preferably an integer of 0 or 1, an integer of 2 or 3 and an integer of 1 or 2, respectively, and "p", "q" and "r" are more preferably 0, 3 and 1, respectively. Note that, when "p" is 2, the two groups represented by $R^{12}$ contained in one molecule of the compound represented by the general formula (7) may be the same or different from each other. Similarly, when "q" is 2 or 3, a plural number of groups represented by $A^1$ contained in one molecule of the compound represented by the general formula (7) may be the same or different from each other, and when "r" is 2 or 3, a plural number of groups represented by $A^2$ contained in one molecule of the compound represented by the general formula (7) may be the same or different from each other.

Specific examples of the compound represented by the general formula (7) above are not particularly limited, but for example, as compounds in which $A^2$ in the general formula (7) is a group containing a primary amino group having an active hydrogen atom and/or a secondary amino group having an active hydrogen atom, compounds having 3-aminopropyl group as $A^2$, such as 3-aminopropyldimethylmethoxysilane, 3-aminopropylmethyldimethoxysilane, 3-aminopropyltrimethoxysilane, 3-aminopropyldimethylethoxysilane, 3-aminopropylmethyldiethoxysilane and 3-aminopropyltriethoxysilane; compounds having 4-aminobutyl group as $A^2$, such as 4-aminobutyldimethylmethoxysilane, 4-aminobutylmethyldimethoxysilane, 4-aminobutyltrimethoxysilane, 4-aminobutylmethyldiethoxysilane and 4-aminobutyltriethoxysilane; compounds having 3-(2-aminoethylamino)propyl group as $A^2$, such as 3-(2-aminoethylamino)propyldimethylmethoxysilane, 3-(2-aminoethylamino)propylmethyldimethoxysilane, 3-(2-aminoethylamino)propyltrimethoxysilane, 3-(2-aminoethylamino)propyldimethylethoxysilane, 3-(2-aminoethylamino)propylmethyldiethoxysilane and 3-(2-aminoethylamino)propyltrimethoxysilane; etc. may be mentioned.

Further, as compounds in which $A^2$ in the general formula (7) is a group other than a group containing a primary amino group having an active hydrogen atom and/or a secondary amino group having an active hydrogen atom, compounds having 3-dimethylaminopropyl group as $A^2$, such as 3-dimethylaminopropyltrimethoxysilane, 3-dimethylaminopropylmethyldimethoxysi lane, 3-dimethylaminopropyldimethylmethoxysi lane, 3-dimethylaminopropyltriethoxysilane, 3-dimethylaminopropylmethyldiethoxysilane and 3-dimethylaminopropyldimethylethoxysilane; compounds having 3-diethylaminopropyl group as $A^2$, such as 3-diethylaminopropyltrimethoxysilane, 3-diethylaminopropylmethyldimethoxysilane, 3-diethylaminopropyldimethylmethoxysilane, 3-diethylaminopropyltriethoxysilane, 3-diethylaminopropylmethyldiethoxysilane and 3-diethylaminopropyldimethylethoxysilane; compounds having 3-dipropylaminopropyl group as $A^2$, such as 3-dipropylaminopropyltrimethoxysilane, 3-dipropylaminopropylmethyldimethoxysilane, 3-dipropylaminopropyldimethylmethoxysilane, 3-dipropylaminopropyltriethoxysilane, 3-dipropylaminopropylmethyldiethoxysilane and 3-dipropylaminopropyldimethylethoxysilane; compounds having 3-dibutylaminopropyl group as $A^2$, such as 3-dibutylaminopropyltrimethoxysilane, 3-dibutylaminopropylmethyldimethoxysilane, 3-dibutylaminopropyldimethylmethoxysilane, 3-dibutylaminopropyltriethoxysilane, 3-dibutylaminopropylmethyldiethoxysilane and 3-dibutylaminopropyldimethylethoxysilane; compounds having 3-phenylmethylaminopropyl group as $A^2$, such as 3-phenylmethylaminopropyltrimethoxysilane, 3-phenylmethylaminopropylmethyldimethoxysilane, 3-phenylmethylaminopropyldimethylmethoxysilane, 3-phenylmethylaminopropyltriethoxysilane, 3-phenylmethylaminopropylmethyldiethoxysilane and 3-phenylmethylaminopropyldimethylethoxysilane; compounds having 3-(4-methylpiperazinyl)propyl group as $A^2$, such as 3-(4-methylpiperazinyl)propyltrimethoxysilane, 3-(4-methylpiperazinyl)propylmethyldimethoxysilane, 3-(4-methylpiperazinyl)propyldimethylmethoxysilane, 3-(4-methylpiperazinyl)propyltriethoxysilane, 3-(4-methylpiperazinyl)propylmethyldiethoxysilane and 3-(4-methylpiperazinyl)propyldimethylethoxysilane;

compounds having N,N-bis(trimethylsilyl)aminopropyl group as $A^2$, such as N,N-bis(trimethylsilyl)aminopropyltrimethoxysilane, bis(trimethylsilyl)aminopropyltriethoxysilane, bis(trimethylsilyl)aminopropylmethyldimethoxysilane and N,N-bis(trimethylsilyl)aminopropylmethyldiethoxysilane; compounds having N,N-bis(triethylsilyl)aminopropyl group as $A^2$, such as N,N-bis(triethylsilyl)aminopropyltrimethoxysilane, bis(trimethylsilyl)aminopropyltriethoxysilane, bis(triethylsilyl)aminopropylmethyldimethoxysilane and N,N-bis(triethylsilyl)aminopropylmethyldiethoxysilane; compounds having N,N',N'-tris(trimethylsilyl)-N-(2-aminoethyl)-3-aminopropyl group as $A^2$, such as N,N',N'-tris(trimethylsilyl)-N-(2-aminoethyl)-3-aminopropyltrimethoxysilane, -tris(trimethylsilyl)-N-(2-aminoethyl)-3-aminopropyltriethoxysilane, N,N'N'-tris(trimethylsilyl)-N-(2-aminoethyl)-3-aminopropylmethyldimethoxysilane, N,N',N'-tris(trimethylsilyl)-N-(2-aminoethyl)-3-aminopropylmethyldiethoxysilane; etc. may be mentioned.

Further, as the hydrocarbyloxysilane compound, a compound represented by the following general formula (8) can be suitably used.

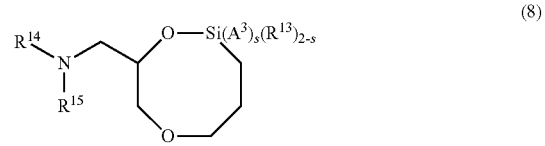

$$\text{(8)}$$

In the general formula (8) above, $A^3$ is a hydrocarbyloxy group, and $R^{13}$ represents a substituted or unsubstituted hydrocarbon group, and $R^{14}$ and $R^{15}$ each independently represents a substituted or unsubstituted hydrocarbon group, and $R^{14}$ and $R^{15}$ may be bonded to each other to form a cyclic structure together with a nitrogen atom to which these are bonded, and when the cyclic structure is famed, the cyclic structure may be famed together with a hetero atom other than the nitrogen atom to which these are bonded, in addition to the nitrogen atom to which these are bonded. "s" is an integer between 0 and 2.

$A^3$ in the general formula (8) above is the hydrocarbyloxy group, and examples thereof include an alkoxy group such as a methoxy group, an ethoxy group, a n-propoxy group, an isopropoxy group, a n-butoxy group, an isobutoxy group, a sec-butoxy group, and a tert-butoxy group; an alkenyloxy group such as a vinyloxy group and an allyloxy group; an aryloxy group such as a phenoxy group and a naphthoxy group; an aralkyloxy group such as a benzyloxy group; and the like. Among these, from the viewpoint of reactivity, an alkoxy group and an aryloxy group are preferred, an alkoxy group is more preferred, and a methoxy group and an ethoxy group are particularly preferred.

In the general formula (8) above, "s" (that is, the number of the groups represented by $A^3$ in the general formula (8)) is an integer of 0 to 2, and "s" is preferably 2. When "s" in the general formula (8) is 2, the two groups represented by $A^3$ contained in one molecule of the compound represented by the general formula (8) may be the same or different from each other.

In the general formula (8) above, $R^{13}$ represents the substituted or unsubstituted hydrocarbon group. The hydrocarbon group which may be the $R^{13}$ is not particularly limited, and examples thereof include an alkyl group such as a methyl group, an ethyl group, an n-propyl group, an isopropyl group, an n-butyl group, an isobutyl group, a sec-butyl group, and a tert-butyl group; alkenyl groups such as a vinyl group and an allyl group; alkynyl groups such as an ethynyl group and a propynyl group; aryl groups such as a phenyl group and a naphthyl group; aralkyl group such as a benzyl group; and the like. Among these, an alkyl group and an aryl group are preferred, an alkyl group is more preferred, and a methyl group and an ethyl group are particularly preferred. Further, the hydrocarbon group represented by $R^{13}$ may have a substituent other than the hydrocarbon group, and the substituent is not particularly limited, and examples thereof include a carbonyl group-containing group such as a carboxyl group, an acid anhydride group, a hydrocarbyl carbonyl group, an alkoxycarbonyl group, and an acyloxy group, and an epoxy group, an oxy group, a cyano group, an amino group, a halogen group and the like. Note that, when "s" in the general formula (8) is 0, the two groups represented by $R^{13}$ contained in one molecule of the compound represented by the general formula (8) may be the same or different from each other.

In the general formula (8) above, $R^{14}$ and $R^{15}$ each independently represents the substituted or unsubstituted hydrocarbon group, and $R^{14}$ and $R^{15}$ may be connected to each other to form a cyclic structure, forming a cyclic structure together with the nitrogen atom to which they are bonded. In addition, when these form the cyclic structure, in addition to the nitrogen atom to which these are bonded, a cyclic structure may be formed together with a hetero atom other than the nitrogen atom to which these are bonded. The hydrocarbon groups that may be $R^{14}$ and $R^{15}$ when $R^{14}$ and $R^{15}$ are not bonded to each other include, but are not limited to, an alkyl group such as a methyl group, an ethyl group, an n-propyl group, an isopropyl group, an n-butyl group, an isobutyl group, a sec-butyl group, and a tert-butyl group; alkenyl groups such as a vinyl group and an allyl group; alkynyl groups such as an ethynyl group and a propynyl group; aryl groups such as a phenyl group and a naphthyl group; aralkyl group such as a benzyl group; and the like. Among these, an alkyl group and an aryl group are preferred, an alkyl group is more preferred, and a methyl group and an ethyl group are particularly preferred. In addition, when $R^{14}$ and $R^{15}$ are bonded to each other to form a cyclic structure together with the nitrogen atom to which they are bonded, divalent hydrocarbon groups formed by bonding $R^{14}$ and $R^{15}$ include, but are not limited to, an alkylene group such as an n-butylene group (in the case of forming a 1-pyrrolidine group with the nitrogen atom to which they are bonded in the general formula (8)), an n-pentylene group (in the case of forming a 1-piperidine group); a butadienylene group (in the case of forming a 1-pyrrole group), and the like.

Note that, when $R^{14}$ and $R^{15}$ are bonded to each other to form the cyclic structure together with the nitrogen atom to which these are bonded, a four to eight-membered cyclic structure is preferred as the cyclic structure.

Further, the hydrocarbon group represented by $R^{14}$ and $R^{15}$ may have a substitute other than a hydrocarbon group, regardless of whether a cyclic structure is formed, and the substituent is not particularly limited, and examples thereof include a carbonyl group-containing group such as a carboxyl group, an acid anhydride group, a hydrocarbyl carbonyl group, an alkoxycarbonyl group, and an acyloxy group; an epoxy group; an oxy group; a cyano group; an amino group; a halogen group; and the like. In addition, when $R^{14}$ and $R^{15}$ are bonded to each other to form a cyclic structure together with the nitrogen atom to which they are bonded, a carbon atom and a hetero atom other than the nitrogen atom to which these are bonded may be contained as an atom forming the cyclic structure, and examples of such hetero atoms include a nitrogen atom and an oxygen atom.

Examples of the compound represented by the general formula (8) above include those in which the hydrocarbon groups represented by $R^{14}$ and $R^{15}$ are bonded to each other to form a piperazine cyclic structure together with a nitrogen atom to which these are bonded. More specifically, a compound represented by the following general formula (9) is particularly preferred. By using a compound having such a structure as the compound represented by the general formula (8), it is possible to make the obtained cross-linked rubber particularly excellent in low heat buildup.

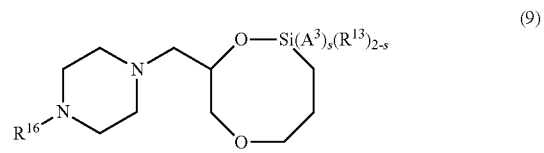

(9)

In the general formula (9) above, $A^3$, $R^{13}$, and "s" each represents the same as in the general formula (8) above, and $R^{16}$ represents a hydrocarbon group.

$R^{16}$ in the general formula (9) above represents a hydrocarbon group. The hydrocarbon group which may be a $R^{16}$ is not particularly limited, and examples thereof include alkyl groups such as a methyl group, an ethyl group, an n-propyl group, an isopropyl group, an n-butyl group, an isobutyl group, a sec-butyl group, a tert-butyl group; alkenyl groups such as a vinyl group and an allyl group; alkynyl groups such as an ethynyl group and a propynyl group; aryl groups such as a phenyl group and a naphthyl group; aralkyl groups such as a benzyl group; and the like. Among these, an alkyl group and an aryl group are preferred, an alkyl group is more preferred, and a methyl group is particularly preferred.

Specific examples of the compounds represented by the general formula (8) above include 2,2-dimethoxy-8-(4-methylpiperazinyl)methyl-1,6-dioxa-2-silacyclooctane, 2,2-diethoxy-8-(4-methylpiperazinyl)methyl-1,6-dioxa-2-silacyclooctane, 2,2-dimethoxy-8-(N,N-diethylamino)methyl-1,6-dioxa-2-silacyclooctane, 2-methoxy-2-methyl-8-(4-methylpiperazinyl)methyl-1,6-dioxa-2-silacooctane, and the like. These compounds represented by the general formula (8) may be used as single type alone or may be used as two types or more combined.

Among the hydrocarbyloxysilane compound, a compound represented by the general formula (7) above is preferred from the viewpoint that the obtained cross-linked rubber can be made more excellent in low heat buildup and wet grip, and a compound in which $A^2$ in the general formula (7) above is a group containing the primary amino group having the active hydrogen atom and/or the secondary amino group having the active hydrogen atom is more preferred, and a compound in which $A^2$ in the general formula (7) above is a group containing both the primary amino group having the active hydrogen atom and the secondary amino group having the active hydrogen atom is further preferred.

In third step of the method of production according to the present invention, the amount of the hydrocarbyloxysilane compound to be used is not particularly limited, but is preferably 0.1 to 5 mol, more preferably 0.2 to 2 mol, and still more preferably 0.4 to 1.5 mol, with respect to 1 mol of the active end of the conjugated diene polymer chain having the active end obtained in the first step. By setting the amount of the hydrocarbyloxysilane compound to be used within the above range, the obtained cross-linked rubber can be made more excellent in the low heat buildup and wet grip.

The method of reacting the hydrocarbyloxysilane compound with the conjugated diene polymer chain is not particularly limited, and examples thereof include a method of mixing them in a solvent in which each of them can be dissolved. As the solvent used in this case, those exemplified as the inert solvent used in the above-mentioned first and second steps can be used. In addition, at this time, in the above-mentioned second step, a method of adding the hydrocarbyloxysilane compound to a reaction solution used for reacting the siloxane compound with the conjugated diene polymer chain having the active end is convenient and thus preferable. Furthermore, in this case, the hydrocarbyloxysilane compound is preferably dissolved in the inert solvent and then added to the polymerization system, and the solution concentration thereof is preferably in the range of 1 to 50 wt %. The reaction temperature is not particularly limited, but is usually 0 to 120° C., and the reaction time is not particularly limited, but is usually 1 minute to 1 hour.

The time at which the hydrocarbyloxysilane compound is added to the solution containing the conjugated diene polymer chain is not particularly limited as long as after the siloxane compound is added in the above-mentioned second step, but in the same manner as the above-mentioned second step, it is desirable to add the hydrocarbyloxysilane compound to the solution in a state in which the polymerization reaction is not completed and the solution containing the conjugated diene polymer chain also contains a monomer, more specifically, in a state in which the solution containing the conjugated diene polymer chain contains the monomer of 100 ppm or more, more preferably 300 to 50,000 ppm. By carrying out the addition of the hydrocarbyloxysilane compound in this manner, it is possible to inhibit side reactions between the conjugated diene polymer chain and impurities and the like contained in the polymerization system, and thus to preferably control the reaction.

Note that, in the second step and the third step of the method of production according to the present invention, in a state before reacting the siloxane compound and the hydrocarbyloxysilane compound with the conjugated diene polymer chain having the active end; in a state after reacting only the siloxane compound and before reacting the hydrocarbyloxysilane compound; or in a state that the conjugated diene polymer chain having the active end remains after reacting both the siloxane compound and the hydrocarbyloxysilane compound, so long as the effects of the present invention are not impaired, coupling or modification may be performed to a part of the active end of the conjugated diene polymer chain having the active end by adding a coupling agent or a modifier, which has been conventionally used, to the polymerization system.

In method of production according to the present invention, it is preferable to perform the coupling or modification to a part of the active end of the conjugated diene polymer chain having the active end in the second step by adding a modifier containing a nitrogen atom in a state before reacting the siloxane compound with the conjugated diene polymer chain having the active end. This enables to further enhance the effect of improving low heat buildup, wet grip, and operation stability. Note that, the modifier containing the nitrogen atom is not particularly limited, but the modifier containing the nitrogen atom and not containing the silicon atom is preferred from the viewpoint of having a large effect of adding the same.

Examples of the modifier containing the nitrogen atom include, for example, N-substituted cyclic amides such as N-substituted cyclic amides such as N-methyl-2-pyrrolidone, N-vinyl-2-pyrrolidone, N-phenyl-2-pyrrolidone, and N-methyl-ε-caprolactam; N-substituted cyclic ureas such as 1,3-dimethylethylene urea and 1,3-diethyl-2-imidazolidinone; N-substituted aminoketones such as 4,4'-bis(dimethylamino)benzophenone and 4,4'-bis(diethylamino)benzophenone; aromatic isocyanates such as diphenylmethane diisocyanate and 2,4-tolylene diisocyanate; N-substituted aminoaldehydes such as 4-N,N-dimethylaminobenzaldehyde; N-substituted carbodiimides such as dicyclohexylcarbodiimide; Schiff bases such as N-ethylethylideneimine and N-methylbenzylideneimine; pyridyl group-containing vinyl compounds such as 4-vinylpyridine; urea compounds such as N,N'-dimethylurea, N,N'-diethylurea, N,N,N',N'-tetramethylurea, N,N-dimethyl-N',N'-diphenylurea;

amide compounds such as N,N-dimethylformamide, acetamide, N,N-diethylacetamide, aminoacetamide, N,N-dimethyl-N',N'-dimethylaminoacetamide, N,N-dimethylaminoacetamide, N,N-ethylaminoacetamide, N,N-dimethyl-N'-ethylaminoacetamide, acrylamide, N,N-dimethylacrylamide, N,N-dimethylmethacrylamide, nicotinamide, isonicotinamide, picolinic acid amide, N,N-dimethylisonicotinamide, Succinamide, phthalamide, N,N,N',N'-tetramethylphthalamide, oxamide, N,N,N',N'-tetramethyloxamide, 2-furancarboxylic acid amide, N,N-Dimethyl-2-furancarboxylic acid amide, quinoline-2-carboxylic acid amide, and N-ethyl-N-methyl-quinolinecarboxylic acid amide; imide compounds such as succinimide, N-methylsuccinimide, maleimide, N-methylmaleimide, phthalimide and N-methylphthalimide; N-alkyl substituted oxazolidinone compound such as 1,3-diethyl-2-imidazolidinone, 1,3-dimethyl-2-imidazolidinone, 1,1-dipropyl-2-imidazolidinone, 1-methyl-3-ethyl-2-imidazolidinone, 1-methyl-3-propyl-2-imidazolidinone, 1-methyl-3-butyl-2-imidazolidinone, 1-methyl-3-(2-methoxyethyl)-2-imidazolidinone, 1-methyl-3-(2-ethoxyethyl)-2-imidazolidinone, and 1,3-di-(2-ethoxyethyl)-2-imidazolidinone; pyridyl-substituted ketone compounds and/or pyridyl-substituted vinyl compounds such as methyl-2-pyridyl ketone, methyl-4-pyridyl ketone, propyl-2-pyridyl ketone, di-4-pyridyl ketone, propyl-3-pyridyl ketone, 2-benzoylpyridine, 2-vinylpyridine, 4-vinylpyridine; lactam compounds such as 2-pyrrolidone, N-methylpyrrolidone, N-phenylpyrrolidone, 2-piperidone, 2-quinolone, N-methylquinolone and ε-caprolactam;

N,N-disubstituted aminoalkyl(meth)acrylamides, for example, N,N-dihydrocarbylaminoethylacrylamides such as N,N-dimethylaminoethylacrylamide and N,N-diethylaminoethylacrylamide, N,N-dihydrocarbylaminopropylacrylamides such as N,N-dimethylaminopropylacrylamide and N,N-diethylaminopropylacrylamide, N,N-dihydrocarbylaminobutylacrylamides such as N,N-dimethylaminobutylacrylamide and N,N-diethylaminobutylacrylamide, N,N-dihydrocarbylaminoethylmethacrylamides such as N,N-dimethylaminoethylmethacrylamide and N,N-diethylaminoethylmethacrylamide, N,N-dihydrocarbylaminopropyl methacrylamides such as N,N-dimethylaminopropyl methacrylamide and N,N-diethylaminopropyl methacrylamide, N,N-dihydrocarbylaminobutylmethacrylamides such as N,N-dimethylaminobutylmethacrylamide and N,N-diethylaminobutylmethacrylamide; and the like.

Among the modifier containing the nitrogen atom as mentioned above, N-substituted cyclic amides, aromatic isocyanates, N,N-disubstituted aminoalkyl (meth)acrylamides are preferred, N-substituted cyclic amides are more preferred, and N-phenyl-2-pyrrolidone is particularly preferred. The modifier containing the nitrogen atom and not containing the silicon atom may be used as single type alone or may be used as two types or more combined.

When the modifier containing the nitrogen atom is added to perform the coupling or modification, the amount of the modifier containing the nitrogen atom to be used is preferably 0.05 to 0.95 mol, more preferably 0.2 to 0.8 mol, and still more preferably 0.3 to 0.7 mol, with respect to 1 mol of the active end of the conjugated diene polymer chain having the active end obtained in the first step. By setting the amount of the modifier containing the nitrogen atom to be used within the above range, it is possible to more appropriately enhance the low heat buildup, wet grip, and operation stability of the obtained cross-linked rubber.

Then, in the third step, it is preferable to add a polymerization terminator such as alcohol (e.g., methanol and isopropanol) and water to deactivate the unreacted active end after reacting the hydrocarbyloxysilane compound with the conjugated diene polymer chain.

After the deactivation of the active ends of the conjugated diene polymer chains, an antioxidant such as a phenol-based stabilizer, a phosphorus-based stabilizer, or a sulfur-based stabilizer, a crumb forming agent, a scale inhibitor, and the like are added to the reaction solution as needed. Subsequently, the polymerization solvent is separated from the reaction solution by direct drying or steam stripping to recover the conjugated diene rubber. The conjugated diene rubber may be recovered as an oil extended rubber by mixing an extender oil with the polymerization solution before the separation of the polymerization solvent from the reaction solution.

As the oil extender used for collecting the conjugated diene rubber as an oil extended rubber, for example, a paraffin-based, aromatic-based, and naphthene-based oil-based softening agent, plant-based softening agent, fatty acid, etc. may be mentioned. When using the oil-based softening agent, the content of the polycyclic aromatic compound extracted by the method of IP346 (test method of THE INSTITUTE PETROTEUM of the U.K.) is preferably less than 3%. When using an oil extender, the amount of use is preferably 5 to 100 parts by weight, more preferably 10 to 60 parts by weight, further preferably 15 to 50 parts by weight, with respect to 100 parts by weight of the conjugated diene rubber.

The conjugated diene rubber thus obtained by the method of production according to the present invention is conjugated diene rubber obtained by performing a reaction using the siloxane compound as a modifier in the above-mentioned second step, and then performing a reaction using the hydrocarbyloxysilane compound as a modifier in the above-mentioned third step. Therefore, the conjugated diene rubber obtained by the method of production according to the present invention includes those to the polymer chain ends of which a modified structure derived from the siloxane compound and a modified structure derived from the hydrocarbyloxysilane compound are introduced, but other than such ones, it may include those to the polymer chain ends of which only the modified structure derived from the siloxane compound is introduced, those to the polymer chain ends of which only the modified structure derived from the hydrocarbyloxysilane compound is introduced, and further, those to which none of the modified structures is introduced. Moreover, in the second step, when a part of the active end of the conjugated diene polymer chain having the active end is subjected to the coupling or modification by adding the modifier containing the nitrogen atom in a state before reacting the siloxane compound with the conjugated diene polymer chain having the active end, the conjugated diene rubber may include those to the polymer chain ends of which a coupling structure or modified structure derived from the modifier containing the nitrogen atom.

Further, the coupling ratio of the conjugated diene rubber obtained by the method of production according to the present invention is preferably 10 wt % or more, more preferably 15 wt % or more, particularly preferably 20 wt % or more, and is preferably 80 wt % or less, more preferably 75 wt % or less, particularly preferably 70 wt % or less, although not particularly limited thereto. A coupling ratio within the above ranges results in a cross-linked rubber having a favorable balance between mechanical strength and wear resistance. The coupling ratio refers to the weight fraction of polymer molecules having a molecular weight at least 1.8 times the peak top molecular weight of the conjugated diene polymer chain having an active end before the reaction with the siloxane compound and the hydrocarbyloxysilane compound, and the optional coupling agent and modifier with respect to the total weight of the finally obtained conjugated diene rubber. The molecular weight is measured by gel permeation chromatography in terms of polystyrene standards.

Further, the weight average molecular weight (Mw) of the conjugated diene rubber obtained by the method of production according to the present invention is, in terms of the value measured by gel permeation chromatography in tams of polystyrene standards, preferably 100,000 to 3,000,000, more preferably 150,000 to 2,000,000, particularly preferably 200,000 to 1,500,000. By making the weight average molecular weight of the conjugated diene rubber within the above range, silica is easily added to the conjugated diene rubber and the processability of the rubber composition can be more enhanced, and further low heat buildup of the obtained cross-linked rubber can be more enhanced.

The molecular weight distribution represented by the ratio (Mw/Mn) of the weight average molecular weight (Mw) and the number average molecular weight (Mn) of the conjugated diene rubber obtained by the method of production according to the present invention is preferably 1.1 to 3.0, more preferably 1.2 to 2.5, particularly preferably 1.2 to 2.2. By making the molecular weight distribution (Mw/Mn) of the conjugated diene rubber the above range, low heat buildup of the obtained cross-linked rubber can be more enhanced.

Further, the Mooney viscosity ($ML_{1+4}$, 100° C.) of the conjugated diene rubber obtained by the method of production according to the present invention is preferably 20 to 100, more preferably 30 to 90, particularly preferably 35 to 80. Note that, when the conjugated diene rubber is an oil extended rubber, it is preferable that the Mooney viscosity of the oil extended rubber be within the above range.

The conjugated diene rubber obtained by the method of production according to the present invention in this way can be suitably used for various applications by adding compounding ingredients such as a filler and cross-linking agent. Particularly, when adding a filler comprised of silica, a rubber composition able to give a cross-linked rubber excellent in low heat buildup and wet grip is given.

<Rubber Composition>

The rubber composition according to the present invention is a composition prepared by adding silica to the rubber ingredient containing the conjugated diene rubber obtained by the method of production according to the present invention above.

The rubber composition according to the present invention may contain other rubbers than the conjugated diene rubber obtained by the method of production according to the present invention above. The other rubbers indicate those such as natural rubbers (those may be reformed natural rubbers such as epoxidized natural rubbers (ENR), hydrogenated natural rubbers (HNR), deproteinized natural rubbers (DPNR), high purity natural rubbers (UPNR), grafted natural rubbers, and the like), polyisoprene rubbers, emulsion polymerized styrene-butadiene copolymer rubbers, solution polymerized styrene-butadiene copolymer rubbers, polybutadiene rubbers (those may be high-cis-BR or lowcis-BR, or may be polybutadiene rubbers containing crystal fibers made of a 1,2-polybutadiene polymer), styrene-isoprene copolymer rubbers, butadiene-isoprene copolymer rubbers, styrene-isoprene-butadiene copolymer rubbers, acrylonitrile-butadiene copolymer rubbers, acrylonitrile-styrene-butadiene copolymer rubbers, butyl rubbers (IIR), ethylene-propylene copolymers, chloroprene rubbers, nitrile chloroprene rubbers, and nitrile isoprene rubbers, where the conjugated diene rubber obtained by the method of production according to the present invention above is excluded, for example. Among these, preferred are natural rubbers, polyisoprene rubbers, polybutadiene rubbers, and solution polymerized styrene-butadiene copolymer rubbers. These rubbers may be used alone or in combination, for example, as a combination of a natural rubber and a polybutadiene rubber, a natural rubber and a styrene-butadiene copolymer rubber, and the like.

In the rubber composition according to the present invention, the conjugated diene rubber obtained by the method of production according to the present invention occupies preferably 10 to 100 wt %, particularly preferably 50 to 100 wt % of the rubber ingredient in the rubber composition. When the rubber ingredient includes the conjugated diene rubber obtained by the method of production according to the present invention in such a proportion, a cross-linked rubber excellent in low heat buildup, wet grip, and operation stability can be obtained.

Examples of the silica used in the present invention include dry white carbon, wet white carbon, colloidal silica, sedimented silica, calcium silicate, aluminum silicate, and the like. Among these, preferred is wet white carbon containing hydrous silicic acid as the main component. A carbon-silica dual phase filler comprising carbon black and silica carried on the surface thereof may also be used. These silicas may be used alone or in combination. The nitrogen adsorption specific surface area (measured by the BET method according to ASTM D3037-81) of the silica to be used is preferably 20 to 400 $m^2/g$, more preferably 50 to 220 $m^2/g$, particularly preferably 80 to 170 $m^2/g$. The silica preferably has a pH of 5 to 10.

The silica to be used in the present invention has a dibutyl phthalate (DBP) absorption number in the range of preferably about 100 to about 400, particularly preferably about 150 to about 300.

Although the silica to be used in the present invention preferably has an average limit particle size in the range of 0.01 to 0.05 µm measured with an electronic microscope, the average limit particle size of the silica is not limited to this range and may be smaller or larger than that.

The silica to be used in the present invention can be, for example, a variety of commercially available silicas. Examples thereof include Hi-Sil 210, Hi-Sil 233, and Hi-Sil 243LD available from PPG Industries, Inc.; Zeosil 1115MP, Zeosil 1165MP, Zeosil 165GR, Zeosil Premium 200MP available from Solvay S.A.; ULTRASIL VN2 and ULTRASIL VN3 available from EVONIK AG; and the like.

The compounding amount of silica in the rubber composition according to the present invention is preferably 10 to 250 parts by weight, more preferably 15 to 150 parts by weight, still more preferably 20 to 130 parts by weight with respect to 100 parts by weight of the rubber ingredient in the rubber composition. The compounding amount of silica controlled within this range results in a cross-linked rubber having further enhanced wet grip, reduced heat buildup, and enhanced operation stability.

To provide further reduced heat buildup, a silane coupling agent may be further compounded with the rubber composition according to the present invention. The silane coupling agent is not particularly limited, and a variety of silane coupling agents can be used. In the present invention, sulfide-based, mercapto-based, protected mercapto-based (such as those having a carbonylthio group), thiocyanate-based, vinyl-based, amino-based, methacrylate-based, glycidoxy-based, nitro-based, epoxy-based, or chloro-based silane coupling agents can be suitably used. Specific examples of the silane coupling agents include bis(3-(triethoxysilyl) propyl)disulfide, bis(3-triethoxysilylpropyl) trisulfide, bis(3-(triethoxysilyl)propyl)tetrasulfide, γ-mercaptopropyltriethoxysilane, 3-[ethoxy-bis(3,6,9,12,15-pentaoxaoctacosan-1-yloxy)silyl]-1-propanethiol, 3-octanoylthio-1-propyl-triethoxysilane, 3-trimethoxysilylpropyl-N,N-dimethylthiocarbamoyl tetrasulfide, γ-trimethoxysilylpropylbenzothiazyl tetrasulfide, 3-trimethoxysilylpropylbenzothiazole tetrasulfide, 3-thiocyanate propyltriethoxysilane, vinyltriethoxysilane, N-(β-aminoethyl)-γ-aminopropyltrimethoxysilane, 3-trimethoxysilylpropylmethacrylate monosulfide, γ-glycidoxypropyltriethoxysilane, 3-nitropropyltrimethoxysilane, β-(3,4-epoxycyclohexyl)ethyltrimethoxysilane, 3-chloropropyltrimethoxysilane, and the like. NXT-Z100, NXT-Z30, NXT-Z45, NXT-Z60, NXT-Z45, and NXT available from Momentive Performance Materials Inc., Si69, Si75, and VP Si363 available from Evonik AG, and the like can also be used. These silane coupling agents may be used alone or in combination. One or two or more of these silane coupling agents may be preliminarily famed into an oligomer, and may be used in the oligomer form. The compounding amount of the silane coupling agent is preferably 0.1 to 30 parts by weight, more preferably 1 to 15 parts by weight with respect to 100 parts by weight of silica.

Moreover, carbon blacks such as furnace black, acetylene black, thermal black, channel black, and graphite may be further compounded with the rubber composition according to the present invention. Among these, furnace black is preferred. These carbon blacks may be used alone or in combination. The compounding amount of carbon black is usually 120 parts by weight or less with respect to 100 parts by weight of the rubber ingredient in the rubber composition.

The method of adding silica to the rubber ingredient including the conjugated diene rubber obtained by the method of production according to the present invention is not particularly limited, but the method of adding it to and kneading it with the solid rubber ingredient (dry kneading method), the method of adding it to a solution containing the conjugated diene rubber and coagulating and drying them (wet kneading method), etc. may be applied.

Preferably, the rubber composition according to the present invention further contains a cross-linking agent. Examples of the cross-linking agent include sulfur, sulfur-containing compounds such as halogenated sulfur, organic peroxides, quinone dioximes, organic polyvalent amine compounds, alkylphenol resins having a methylol group, and the like. Among these, sulfur is preferably used. The compounding amount of the cross-linking agent is preferably 0.1 to 15 parts by weight, more preferably 0.5 to 5 parts by weight, particularly preferably 1 to 4 parts by weight with respect to 100 parts by weight of the rubber ingredient in the rubber composition.

Furthermore, besides the ingredients above, necessary amounts of compounding agents such as a cross-linking accelerator, a cross-linking activator, an antioxidant, a filler (excluding the silica and carbon black described above), an activating agent, a process oil, a plasticizer, a lubricant, a compatibilizing agent, a surfactant, and the like can be compounded with the rubber composition according to the present invention in accordance with ordinary methods.

When sulfur or a sulfur-containing compound is used as the cross-linking agent, use in combination with a cross-linking accelerator and a cross-linking activator is preferred. Examples of the cross-linking accelerator include sulfenamide-based cross-linking accelerators; guanidine-based cross-linking accelerators; thiourea-based cross-linking accelerators; thiazole-based cross-linking accelerators; thiuram-based cross-linking accelerators; dithiocarbamic acid-based cross-linking accelerators; xanthic acid-based cross-linking accelerators; and the like. Among these, preferred are those containing sulfenamide-based cross-linking accelerators. These cross-linking accelerators are used alone or in combination. The compounding amount of the cross-linking accelerator is preferably 0.1 to 15 parts by weight, more preferably 0.5 to 5 parts by weight, particularly preferably 1 to 4 parts by weight with respect to 100 parts by weight of the rubber ingredient in the rubber composition.

Examples of the cross-linking activator include higher fatty acids such as stearic acid; zinc oxide; and the like. These cross-linking activators are used alone or in combination. The compounding amount of the cross-linking activator is preferably 0.05 to 20 parts by weight, particularly preferably 0.5 to 15 parts by weight with respect to 100 parts by weight of the rubber ingredient in the rubber composition.

In addition, in the rubber composition according to the present invention, a resin may be blended in addition to the rubber ingredient. By blending the resin, it is possible to impart tackiness to the rubber composition or to enhance dispersibility of the filler in the rubber composition. As a result, it is expected that wet grip and wear resistance of the obtained cross-linked rubber can be improved. Further, as an effect similar to that of the plasticizer, it is also possible to improve the processability of the rubber composition. Examples of the resin include a C5 petroleum resin, a C5/C9 petroleum resin, a C9 petroleum resin, a dicyclopentadiene resin, a terpene resin, a terpene phenol resin, an aromatic modified terpene resin, an alkylphenol-acetylene resin, a rosin resin, a rosinester resin, an indene resin, a C9 resin containing indene, a α-methylstyrene-indene copolymer resin, a coumarone-indene resin, a farnesene-based resin, a polylimonene resin, and the like. These resins may be modified, or may be hydrogenated. Each of these resins may be used as single type alone or may be used as two types or more combined. The amount of the resin to be blended is preferably 25 parts by weight or less with respect to 100 parts by weight of the rubber ingredient in the rubber composition.

To obtain the rubber composition according to the present invention, it is sufficient to knead the ingredients according to an ordinary method. For example, it is possible to knead the ingredients other than thermally unstable ingredients such as cross-linking agent and cross-linking accelerator with the conjugated diene rubber, then mix thermally unstable ingredients such as cross-linking agent and cross-linking accelerator with the kneaded material to obtain the target composition. The kneading temperature of the ingredients other than the thermally unstable ingredients and the conjugated diene rubber is preferably 80 to 200° C., more preferably 120 to 180° C., while the kneading time is preferably 30 seconds to 30 minutes. Further, the kneaded material and thermally unstable ingredients are mixed after cooling them down to usually 100° C. or less, preferably 80° C. or less.

<Cross-Linked Rubber>

The cross-linked rubber according to the present invention is prepared by cross-linking the above-mentioned rubber composition according to the present invention.

The cross-linked rubber according to the present invention can be produced using the rubber composition according to the present invention, for example, by shaping the rubber composition, for example, with a molding machine, an extruder, an injection molding machine, a press, a roll, and the like having a desired shape, and performing a cross-linking reaction by heating to provide a cross-linked rubber having a fixed shape. In this case, the rubber composition may be preliminarily shaped and then cross-linked, or may be shaped and cross-linked at the same time. The shaping temperature is usually 10 to 200° C., preferably 25 to 120° C. The cross-linking temperature is usually 100 to 200° C., preferably 130 to 190° C., and the cross-linking time is usually 1 minute to 24 hours, preferably 2 minutes to 12 hours, particularly preferably 3 minutes to 6 hours.

Depending on the shape, the size, and the like thereof, the inside of the cross-linked rubber may not be sufficiently cross-linked, even when the surface thereof is cross-linked. For this reason, the cross-linked rubber may be further heated for secondary cross-linking.

As a heating method, a common method used to cross-link rubber such as press heating, steam heating, oven heating, or hot air heating can be appropriately selected.

The cross-linked rubber according to the present invention thus obtained is prepared using the above-mentioned conjugated diene rubber obtained by the method of production according to the present invention, and is excellent in wet grip, low heat buildup, and operation stability. Owing to such high wet grip, excellently low heat buildup, and high operation stability, the cross-linked rubber according to the present invention can be used in a variety of applications to parts of tires such as cap treads, base treads, carcasses, sidewalls, and bead parts; materials for industrial products such as hoses, belts, mats, and antivibration rubbers; impact resistance improvers for resins; resin film buffer agents; shoe soles; rubber shoes; golf balls; toys; and the like, for example. In particular, because of its high wet grip, excellently low heat buildup and high operation stability, the cross-linked rubber according to the present invention can be suitably used as a material for tires, particularly a material for tires with low energy consumption, and is most suitable for applications to treads.

EXAMPLES

Hereinafter, the present invention will be described in more details with reference to Examples, but these Examples should not be construed as limitations to the present invention. Hereinafter, "parts" is on a weight basis unless otherwise specified weight. The tests and the evaluations were performed as follows.

[Weight Average Molecular Weight, Molecular Weight Distribution]

The weight average molecular weight (Mw) and the molecular weight distribution (Mw/Mn) were determined based on the chart of the molecular weight determined by gel permeation chromatography in terms of polystyrene standards. The measurement by gel permeation chromatography was performed on the following conditions:

Apparatus for measurement: high performance liquid chromatograph (available from Tosoh Corporation, trade name "HLC-8220")

Columns: two columns available from Tosoh Corporation, trade name "TSKgel SuperHM-H", which were connected in series.

Detector: differential refractometer

Eluent: tetrahydrofuran

Column temperature: 40° C.

[Microstructure]

Vinyl bonds (unit: mol %)

The amount of the vinyl bond in the polymer was determined by infrared spectroscopy from the absorption strength near the 910 cm$^{-1}$, which is the absorption peak of the vinyl group.

Content of styrene unit (unit: wt %)

According to JIS K6383 (1995), the content of styrene unit of the polymer was determined from the refractive index.

[Wet Grip of Cross-Linked Rubber]

With regard to the wet grip, a test piece of the cross-linked rubber having a length of 50 mm, a width of 12.7 mm, and a thickness of 2 mm was evaluated by measuring a value of tan δ at 0° C. under a condition of a dynamic strain of 0.5% and a 10 Hz by using ARES-G2 (available from TA Instruments, Inc.). With regard to the value of tan δ, in Examples 1 to 4 and Comparative Example 1, the measured values are shown as indexes to the measured value of Comparative Example 1 as 100, and in Examples 5,6 and Comparative Examples 2,3, the measured values are shown as indexes to the measured value of Comparative Example 2 as 100. The larger this index, the better the wet grip.

[Low Heat Buildup of Cross-Linked Rubber]

With regard to the low heat buildup, a test piece of the cross-linked rubber having a length of 50 mm, a width of 12.7 mm, and a thickness of 2 mm was evaluated by measuring a value of tan δ at 60° C. under a condition of a dynamic strain of 2.5% and a 10 Hz by using ARES-G2 (available from TA Instruments, Inc.). With regard to the value of tan δ, in Examples 1 to 4 and Comparative Example 1, the measured values are shown as indexes to the measured value of Comparative Example 1 as 100, and in Examples 5,6 and Comparative Examples 2,3, the measured values are shown as indexes to the measured value of Comparative Example 2 as 100. The smaller this index, the better the low heat buildup.

[Operation Stability of Cross-Linked Rubber]

According to JIS K6301, the operation stability was evaluated by performing a tensile test on the cross-linked rubber test piece, and measuring and calculating the value expressed by (stress at 200% elongation)/(stress at 50% elongation). With regard to these values (stress at 200% elongation)/(stress at 50% elongation), in Examples 1 to 4 and Comparative Example 1, the measured values are shown as indexes to the measured value of Comparative Example 1 as 100, and in Examples 5,6 and Comparative Examples 2,3, the measured values are shown as indexes to the measured value of Comparative Example 2 as 100. A greater numeric value indicates higher reinforcing properties of silica and higher operation stability.

Example 1

Under a nitrogen atmosphere, 10.2 kg of industrial hexane (trade name "hexane (common product)" available from Sumitomo Chemical Company, Limited, density: 0.68 g/mL), 16.5 mmol of tetramethylethylenediamine, 707 g of 1,3-butadiene, 373 g of styrene, and 8.41 mmol of bis(diethylamino)methylvinylsilane (a compound being $X^5$=a chemical single bond, $X^6$, $X^7$=a diethylamino group, and $X^8$=a methyl group in the general formula (2) above) were placed into a polymerization reactor made of stainless steel having an inner volume of 20 L equipped with a stirring device, and then 16.8 mmol of n-butyllithium was added thereto so as to initiate polymerization at 40° C. After 12 minutes from the initiation of the polymerization, 598 g of 1,3-butadiene and 122 g of styrene were continuously added over a period of 40 minutes. The maximum temperature during the polymerization reaction was 60° C. After completion of the continuous addition, the polymerization reaction was continued for another 20 minutes, and it was confirmed that the polymerization conversion ratio was in the range of 95% to 100%. Then, polyorganosiloxane represented by the following formula (10) was added so as to be 25.2 mmol in terms of the number of the repeating unit of —Si—O—, and the mixture was allowed to react for 30 minutes. Next, 16.8 mmol of 3-(2-aminoethylamino) propyltrimethoxysilane (a compound being $A^1$=a methoxy group, $A^2$=a 3-(2-aminoethylamino)propyl group, p=0, q=3, and r=1 in the general formula (7) above) was added and reacted for 15 minutes. Then, methanol in an amount equivalent to 2 molar times of n-butyllithium used was added as a polymerization terminator to obtain a solution containing conjugated diene rubber. To this solution, an antioxidant (trade name "Irganox 1520L" available from BASF SE) was added in an amount of 0.15 parts with respect to 100 parts of the conjugated diene rubber, and then the polymerization solution was allowed to stand at room temperature for 24 hours, and the solvent was evaporated to obtain a polymer. Thereafter, the obtained polymer was further dried at 55° C. for 12 hours under reduced pressure to obtain solid conjugated diene rubber. The weight-average molecular weight (Mw) of the obtained conjugated diene rubber of Example 1 was 431,000, the content of styrene monomer unit was 27.5 wt %, and the content of vinyl bond was 57.4 wt %, and the content of bis(diethylamino)methylvinylsilane monomer unit was 0.10 wt % in the obtained conjugated diene rubber of Example 1.

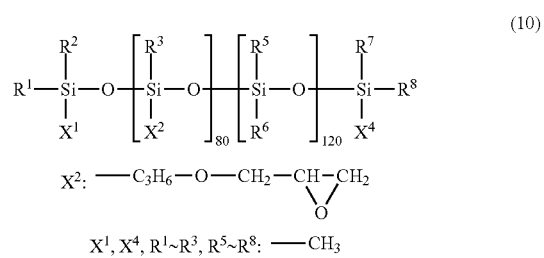

Example 2

Solid conjugated diene rubber was obtained in the same manner as in Example 1, except that in place of 16.8 mmol of 3-(2-aminoethylamino)propyltrimethoxysilane, 16.8 mmol of 3-diethylaminopropyltrimethoxysilane (a compound being $A^1$=a methoxy group, $A^2$=a 3-diethylaminopropyl group, p=0, q=3, and r=1 in the general formula (7) above) was used. The weight-average molecular weight (Mw) of the obtained conjugated diene rubber of Example 2 was 360,000, the content of styrene monomer unit was 27.8 wt %, and the content of vinyl bond was 54.5 wt %, and the content of bis(diethylamino)methylvinylsilane monomer unit was 0.10 wt % in the obtained conjugated diene rubber of Example 2.

Example 3

Solid conjugated diene rubber was obtained in the same manner as in Example 1, except that in place of 16.8 mmol of 3-(2-aminoethylamino) propyltrimethoxysilane, 16.8 mmol of 2,2-dimethoxy-8-(4-methylpiperazinyl)methyl-1,6-dioxa-2-silacyclooctane (a compound being $A^3$=a methoxy group, $R^{16}$=a methyl group, and s=2 in the general formula (9) above) was used. The weight-average molecular weight (Mw) of the obtained conjugated diene rubber of Example 3 was 402,000, the content of styrene monomer unit was 27.0 wt %, and the content of vinyl bond was 54.0 wt %, and the content of bis(diethylamino)methylvinylsilane monomer unit was 0.10 wt % in the obtained conjugated diene rubber of Example 3.

Example 4

214.5 g of cyclohexane and 4.5 mmol of tetramethylethylenediamine were added to a nitrogen-purged vessel of 800 ml, and 45.0 mmol of n-butyllithium was further added thereto. Then, 162.3 g of isoprene and 13.2 g of styrene were slowly added to react in the vessel at 50° C. for 120 minutes, so that a polymer block (A1) having an active end was obtained. The weight-average molecular weight (Mw) of this polymer block (A1) was 6,700, the molecular weight distribution (Mw/Mn) was 1.10, the content of styrene monomer unit was 7.5 wt %, the content of isoprene monomer unit was 92.5 wt %, and the content of vinyl bond was 7.0 wt %.

Under a nitrogen atmosphere, 10.2 kg of industrial hexane (trade name "hexane (common product)" available from Sumitomo Chemical Company, Limited, density: 0.68 g/mL), 14.8 mmol of tetramethylethylenediamine, 707 g of 1,3-butadiene, 373 g of styrene, and 8.41 mmol of bis(diethylamino)methylvinylsilane were placed into a polymerization reactor made of stainless steel having an inner volume of 20 L equipped with a stirring device, and then the polymer block (A1) having the active end obtained above was added thereto in an amount of 16.8 mmol in terms of n-butyllithium used so as to initiate polymerization at 40° C. After 12 minutes from the initiation of the polymerization, 598 g of 1,3-butadiene and 122 g of styrene were continuously added over a period of 40 minutes. The maximum temperature during the polymerization reaction was 60° C. After completion of the continuous addition, the polymerization reaction was continued for another 20 minutes, and it was confirmed that the polymerization conversion ratio was in the range of 95% to 100%. Then, polyorganosiloxane represented by the formula (10) above was added so as to be 25.2 mmol in terms of the number of the repeating unit of —Si—O—, and the mixture was allowed to react for 30 minutes. Next, 16.8 mmol of 3-(2-aminoethylamino)propyltrimethoxysilane was added and allowed to react for 15 minutes. Then, methanol in an amount equivalent to 2 molar times of n-butyllithium used was added as a polymerization terminator to obtain a solution containing a conjugated diene rubber. To this solution, an antioxidant (trade name "Irganox 1520L" available from BASF SE) was added in an amount of 0.15 parts with respect to 100 parts of the conjugated diene rubber, and then the polymerization solution was allowed to stand at room temperature for 24 hours, and the solvent was evaporated to obtain a polymer. Thereafter, the obtained polymer was further dried at 55° C. for 12 hours under reduced pressure to obtain solid conjugated diene rubber. The weight-average molecular weight (Mw) of the obtained conjugated diene rubber of Example 4 was 346,000, the content of styrene monomer unit was 26.9 wt %, and the content of vinyl bond was 55.6 wt %, and the content of bis(diethylamino)methylvinylsilane monomer unit was 0.10 wt % in the obtained conjugated diene rubber of Example 4.

Comparative Example 1

Under a nitrogen atmosphere, 10.2 kg of industrial hexane (trade name "hexane (common product)" available from Sumitomo Chemical Company, Limited, density: 0.68 g/mL), 16.5 mmol of tetramethylethylenediamine, 707 g of 1,3-butadiene, and 373 g of styrene were placed into a polymerization reactor made of stainless steel having an inner volume of 20 L equipped with a stirring device, and then 16.8 mmol of n-butyllithium was added thereto so as to initiate polymerization at 40° C. After 12 minutes from the initiation of the polymerization, 598 g of 1,3-butadiene and 122 g of styrene were continuously added over a period of 40 minutes. The maximum temperature during the polymerization reaction was 60° C. After completion of the continuous addition, the polymerization reaction was continued for another 20 minutes, and it was confirmed that the polymerization conversion ratio was in the range of 95% to 100%. Then, polyorganosiloxane represented by the formula (10) above was added so as to be 25.2 mmol in terms of the number of the repeating unit of —Si—O—, and the mixture was allowed to react for 30 minutes. Next, 16.8 mmol of 2,2-dimethoxy-8-(4-methylpiperazinyl)methyl-1,6-dioxa-2-silacyclooctane was added and allowed to react for 15 minutes. Then, methanol in an amount equivalent to 2 molar times of n-butyllithium used was added as a polymerization terminator to obtain a solution containing a conjugated diene rubber. To this solution, an antioxidant (trade name "Irganox 1520L" available from BASF SE) was added in an amount of 0.15 parts with respect to 100 parts of the conjugated diene rubber, and then the polymerization solution was allowed to stand at room temperature for 24 hours, and the solvent was evaporated to obtain a polymer. Thereafter, the obtained polymer was further dried at 55° C. for 12 hours under reduced pressure to obtain solid conjugated diene rubber. The weight-average molecular weight (Mw) of the obtained conjugated diene rubber of Comparative Example 1 was 412,000, the content of styrene monomer unit was 27.8 wt %, and the content of vinyl bond was 55.4 wt %.

[Production and Evaluation of Rubber Composition and Cross-Linked Rubber]

In a Brabender type mixer having a volume of 250 ml, 80.0 parts of the conjugated diene rubber of Example 1 and 20.0 parts of butadiene rubber (trade name "Nipol BR1220" available from Zeon Corporation) were masticated for 30 seconds. Then, 50 parts of silica (trade name "Zeosil 1165MP" available from Solvay S.A.), 25 parts of process oil (trade name "AROMAX T-DAE" available from JX Nippon Oil & Energy Corporation), and 6.0 parts of a silane coupling agent (trade name "Si69" available from Evonik Industries AG) were added, and the mixture was kneaded for 1.5 minutes at a starting temperature of 110° C. After that, 25 parts of silica (trade name "Zeosil 1165MP" available from Solvay S.A.), 2.5 parts of zinc oxide, 2.0 parts of stearic acid, and 2.0 parts of N-phenyl-N'-(1,3-dimethylbutyl)-p-phenylenediamine (trade name "NOCRAC 6C", available from Ouchi Shinko Chemical Industrial Co., Ltd.) as an antioxidant were added, and the mixture was further kneaded for 2.5 minutes. The kneaded product was discharge from the mixer. The temperature of the kneaded material after the end of kneading was 150° C. The kneaded material was cooled down to room temperature, then kneaded again in a Brabender mixer at a starting temperature of 110° C. for 3 minutes, and subsequently discharged from the mixer. Next, 1.50 parts of sulfur, 1.7 parts of N-cyclohexyl-2-benzthiazolylsulfenamide (trade name "NOCCETFR CZ-G", available from Ouchi Shinko Chemical Industrial Co., Ltd.) and 2.0 parts of 1,3-diphenylguanidine (trade name "NOCCETFR D", available from Ouchi Shinko Chemical Industrial Co., Ltd.) were added to and kneaded with the obtained kneaded product by using a 50° C. open roll mill to prepare a rubber composition. Then, the obtained rubber composition was shaped into a sheet with the 50° C. open roll mill. The obtained sheet-shaped rubber composition was press cross-linked at 160° C. for 20 minutes to prepare a test piece of the cross-linked rubber, and using this test piece, wet grip, low heat buildup, and operation stability were evaluated. The results are shown in Table 1.

In addition, with regard to the conjugated diene rubber of Examples 2 to 4 and Comparative Example 1, test pieces of the cross-linked rubber were prepared in the same manner, and evaluation of wet grip, low heat buildup, and operation stability was performed. The results are shown in Table 1.

TABLE 1

|  | Example 1 | Example 2 |
|---|---|---|
| Formation of polymer block (A) | None | None |
| Vinyl compound having functional group interactive with silica | (Et)₂N—Si(vinyl)—N(Et)₂ | (Et)₂N—Si(vinyl)—N(Et)₂ |
| Modifier used in first modification | Polyorganosiloxane | Polyorganosiloxane |
| Modifier used in second modification | (MeO)₃Si—(CH₂)₃—NH—(CH₂)₂—NH₂ | (MeO)₃Si—(CH₂)₃—N(Et)₂ |
| Wet grip | 106 | 104 |
| Low heat buildup | 87 | 91 |
| Operation stability | 108 | 104 |

|  | Example 3 | Example 4 |
|---|---|---|
| Formation of polymer block (A) | None | Present |
| Vinyl compound having functional group interactive with silica | (Et)₂N—Si(vinyl)—N(Et)₂ | (Et)₂N—Si(vinyl)—N(Et)₂ |
| Modifier used in first modification | Polyorganosiloxane | Polyorganosiloxane |
| Modifier used in second modification | cyclic silane with (MeO)₂Si and N-methylpiperazinylmethyl group | (MeO)₃Si—(CH₂)₃—NH—(CH₂)₂—NH₂ |
| Wet grip | 102 | 106 |
| Low heat buildup | 91 | 72 |
| Operation stability | 106 | 106 |

|  | Comparative Example 1 |
|---|---|
| Formation of polymer block (A) | None |
| Vinyl compound having functional group interactive with silica | Not used |

TABLE 1-continued

| Modifier used in first modification | Polyorganosiloxane |
|---|---|
| Modifier used in second modification | 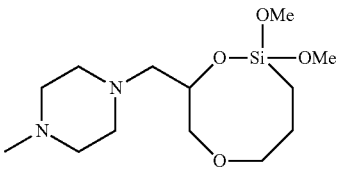 [SMILES: CO[Si]1(OC)CCCOCC(CN2CCN(C)CC2)O1] |
| Wet grip | 100 |
| Low heat buildup | 100 |
| Operation stability | 100 |

In view of Table 1, the cross-linked rubber obtained by cross-linking the conjugated diene rubber prepared by reacting the conjugated diene polymer chain having the active end, which is obtained by polymerizing the monomer containing the conjugated diene compound and the vinyl compound having the functional group interactive with silica, with the siloxane compound, and further reacting with the hydrocarbyloxysilane compound was excellent in low heat buildup, wet grip, and operation stability (Examples 1 to 4).

On the other hand, when the vinyl compound having the functional group interactive with silica was not used when obtaining the conjugated diene polymer chain, the obtained cross-linked rubber was inferior in low heat buildup, wet grip, and operation stability (Comparative Example 1).

Example 5

Under a nitrogen atmosphere, 792 g of cyclohexane, 1.01 mmol of tetramethylethylenediamine, 76.3 g of 1,3-butadiene, 28.7 g of styrene, and 0.051 g of bis(diethylamino)methylvinylsilane were placed into an autoclave equipped with a stirrer, and then 0.58 mmol of n-butyllithium was added thereto, and polymerization was initiated at 60° C. The polymerization reaction was continued for 60 minutes, and after confirming that the polymerization conversion ratio was in the range of 95% to 100%, 0.24 mmol of N-phenylpyrrolidone was added and allowed to react for 15 minutes. Next, polyorganosiloxane represented by the formula (10) above was added so that the content of the repeating unit of —Si—O— was 0.14 mmol with respect to the residual active end of the conjugated diene polymer chain having the active end. The mixture was allowed to react for 20 minutes. Then, 0.24 mmol of 3-(2-aminoethylamino)propyltrimethoxysilane was added and allowed to react for 15 minutes. Subsequently, methanol as a polymerization terminator was added in a 2-fold equimolar amount to the amount of n-butyllithium used to prepare a solution containing a modified conjugated diene rubber. 0.20 parts of IRGANOX 1520L (available from BASF SE) as an antioxidant with respect to 100 parts of the modified conjugated diene rubber was added to the solution. Thereafter, the solvent was removed by steam stripping, followed by vacuum drying at 60° C. for 24 hours to yield solid modified conjugated diene rubber. The weight-average molecular weight (Mw) of the modified conjugated diene rubber thus obtained in Example 5 was 406,000, the content of styrene monomer unit was 26 wt %, and the content of vinyl bond was 58 wt %. Further, the content of bis(diethylamino)methylvinylsilane monomer unit in the modified conjugated diene rubber thus obtained in Example 5 was 0.049 wt %.

Example 6

Under a nitrogen atmosphere, 792 g of cyclohexane, 1.01 mmol of tetramethylethylenediamine, 0.48 mmol of piperidine, 76.3 g of 1,3-butadiene, 28.7 g of styrene, and 0.051 g of bis(diethylamino)methylvinylsilane were placed into an autoclave equipped with a stirrer, and then 0.53 mmol of n-butyllithium was added thereto, and polymerization was initiated at 60° C. After continuing the polymerization reaction for 60 minutes and confirming that the polymerization conversion ratio was in the range of 95% to 100%, polyorganosiloxane represented by the formula (10) above was added so that the content of the repeating unit of —Si—O— was 0.29 mmol, and allowed to react for 20 minutes. Then, 0.96 mmol of 3-(2-aminoethylamino)propyltrimethoxysilane was added and allowed to react for 15 minutes. Subsequently, methanol as a polymerization terminator was added in a 2-fold equimolar amount to the amount of n-butyllithium used to prepare a solution containing modified conjugated diene rubber. 0.20 parts of IRGANOX 1520L (available from BASF SE) as an antioxidant with respect to 100 parts of the modified conjugated diene rubber was added to the solution. Thereafter, the solvent was removed by steam stripping, followed by vacuum drying at 60° C. for 24 hours to yield solid modified conjugated diene rubber. The weight-average molecular weight (Mw) of the modified conjugated diene rubber thus obtained in Example 6 was 375,000, the content of styrene monomer unit was 26 wt %, and the content of vinyl bond was 57 wt %. Further, the content of bis(diethylamino)methylvinylsilane monomer unit in the modified conjugated diene rubber thus obtained in Example 6 was 0.049 wt %.

Comparative Example 2

134.3 g of cyclohexane and 1.0 mmol of tetramethylethylenediamine were added to a nitrogen-purged vessel of 800 ml, and 10.0 mmol of n-butyllithium was further added thereto. Then, 36.1 g of isoprene and 2.9 g of styrene were slowly added to react in the vessel at 50° C. for 120 minutes, so that a polymer block (A2) having an active end was obtained. The weight-average molecular weight (Mw) of this polymer block (A2) was 5,700, the molecular weight distribution (Mw/Mn) was 1.09, the content of styrene monomer unit was 7.4 wt %, the content of isoprene monomer unit was 92.6 wt %, and the content of vinyl bond was 7.3 wt %.

Under a nitrogen atmosphere, 792 g of cyclohexane, 1.22 mmol of tetramethylethylenediamine, 76.3 g of 1,3-butadiene, and 28.7 g of styrene were placed into an autoclave equipped with a stirrer, and then 0.88 mmol of the polymer block (A2) having the active end was added thereto, and polymerization was initiated at 60° C. The polymerization reaction was continued for 60 minutes, and after confirming that the polymerization conversion ratio was in the range of 95% to 100%, 0.31 mmol of N-phenylpyrrolidone was added and allowed to react for 15 minutes. Next, polyorganosiloxane represented by the formula (10) above was added so that the content of the repeating unit of —Si—O— was 0.18 mmol with respect to the residual active end of the conjugated diene polymer chain having the active end. The mixture was allowed to react for 20 minutes. Then, 0.61 mmol of 3-(2-aminoethylamino)propyltrimethoxysilane was added and allowed to react for 15 minutes. Subsequently, methanol as a polymerization terminator was added in a 2-fold equimolar amount to the amount of n-butyllithium used to prepare a solution containing a modified conjugated diene rubber. 0.20 parts of IRGANOX 1520L (available from BASF SE) as an antioxidant with respect to 100 parts of the modified conjugated diene rubber was added to the solution. Thereafter, the solvent was removed by steam stripping, followed by vacuum drying at 60° C. for 24 hours to yield a solid modified conjugated diene rubber. The weight-average molecular weight (Mw) of the modified conjugated diene rubber obtained in Comparative Example 2 was 400,000, the content of styrene monomer unit was 26 wt %, and the content of vinyl bond was 57 wt %.

Comparative Example 3

Under a nitrogen atmosphere, 792 g of cyclohexane, 1.28 mmol of tetramethylethylenediamine, 0.61 mmol of piperidine, 76.3 g of 1,3-butadiene, and 28.7 g of styrene were placed into an autoclave equipped with a stirrer, and then 0.73 mmol of n-butyllithium was added thereto, and polymerization was initiated at 60° C. The polymerization reaction was continued for 60 minutes, and after confirming that the polymerization conversion ratio was in the range of 95% to 100%, 0.31 mmol of N,N-dimethylaminopropyl acrylamide was added and allowed to react for 15 minutes. Next, polyorganosiloxane represented by the formula (10) above was added so that the content of the repeating unit of —Si—O— was 0.18 mmol with respect to the residual active end of the conjugated diene polymer chain having the active end. The mixture was allowed to react for 20 minutes. Then, 0.31 mmol of 3-(2-aminoethylamino)propyltrimethoxysilane was added and allowed to react for 15 minutes. Subsequently, methanol as a polymerization terminator was added in a 2-fold equimolar amount to the amount of n-butyllithium used to prepare a solution containing a modified conjugated diene rubber. 0.20 parts of IRGANOX 1520L (available from BASF SE) as an antioxidant with respect to 100 parts of the modified conjugated diene rubber was added to the solution. Thereafter, the solvent was removed by steam stripping, followed by vacuum drying at 60° C. for 24 hours to yield a solid modified conjugated diene rubber. The weight-average molecular weight (Mw) of the modified conjugated diene rubber obtained in Comparative Example 3 was 287,000, the content of styrene monomer unit was 26 wt %, and the content of vinyl bond was 58 wt %.

[Preparation and Evaluation of Rubber Composition and Cross-Linked Rubber]

With respect to the conjugated diene rubber of Examples 5 and 6 and Comparative Examples 2 and 3, respectively, test pieces of the cross-linked rubber were prepared in the same manner as Example 1, and evaluation of wet grip, low heat buildup, and operation stability was performed. The results are shown in Table 2.

TABLE 2

| | Example 5 | Example 6 |
|---|---|---|
| Formation of polymer block (A) | None | None |
| Modification of initiating end | None | Piperidine |
| Vinyl compound having functional group interactive with silica | (structure) | (structure) |
| Modifier containing nitrogen atom used before first modification | N-phenylpyrrolidone | Not used |
| Modifier used in first modification | Polyorganosiloxane | Polyorganosiloxane |
| Modifier used in second modification | MeO—Si(OMe)(OMe)—CH2CH2CH2—NH—CH2CH2—NH2 | MeO—Si(OMe)(OMe)—CH2CH2CH2—NH—CH2CH2—NH2 |
| Wet grip | 121 | 131 |
| Low heat buildup | 75 | 64 |
| Operation stability | 105 | 106 |

TABLE 2-continued

| | Comparative Example 2 | Comparative Example 3 |
|---|---|---|
| Formation of polymer block (A) | Present | None |
| Modification of initiating end | None | Piperidine |
| Vinyl compound having functional group interactive with silica | Not used | Not used |
| Modifier containing nitrogen atom used before first modification | N-phenylpyrrolidone | N,N-dimethylaminopropylacrylamide |
| Modifier used in first modification | Polyorganosiloxane | Polyorganosiloxane |
| Modifier used in second modification | MeO—Si(OMe)(OMe)—CH₂CH₂CH₂—NH—CH₂CH₂—NH₂ | MeO—Si(OMe)(OMe)—CH₂CH₂CH₂—NH—CH₂CH₂—NH₂ |
| Wet grip | 100 | 104 |
| Low heat buildup | 100 | 98 |
| Operation stability | 100 | 100 |

In view of Table 2, even when the modifier containing the nitrogen atom was used or the modified structure by the secondary amine compound was introduced to the polymerization initiating end, the cross-linked rubber obtained by cross-linking the conjugated diene rubber prepared by reacting the conjugated diene polymer chain having the active end, which is obtained by polymerizing the monomer containing the conjugated diene compound and the vinyl compound having the functional group interactive with silica, with the siloxane compound, and further reacting with the hydrocarbyloxysilane compound was excellent in low heat buildup, wet grip, and operation stability (Examples 5 and 6).

On the other hand, even when the modifier containing the nitrogen atom was used or the modified structure by the secondary amine compound was introduced to the polymerization initiating end, when the vinyl compound having the functional group interactive with silica was not used when obtaining the conjugated diene polymer chain, the obtained cross-linked rubber was inferior in low heat buildup, wet grip, and operation stability (Comparative Examples 2 and 3).

The invention claimed is:

1. A method for producing a conjugated diene rubber, comprising:
    a first step of obtaining a conjugated diene polymer chain having an active end by polymerizing a monomer comprising a conjugated diene compound and a vinyl compound having a functional group interactive with silica using a polymerization initiator in an inert solvent;
    a second step of reacting a siloxane compound with the active end of the conjugated diene polymer chain having the active end; and
    a third step of reacting a hydrocarbyloxysilane compound with the conjugated diene polymer chain with which the siloxane compound is reacted that is obtained in the second step,
    wherein the functional group interactive with silica is at least one selected from a group consisting of a nitrogen atom-containing functional group, a silicon atom-containing functional group, and an oxygen atom-containing functional group.

2. The method for producing the conjugated diene rubber according to claim 1, wherein the siloxane compound is polyorganosiloxane represented by the following general formula (1),

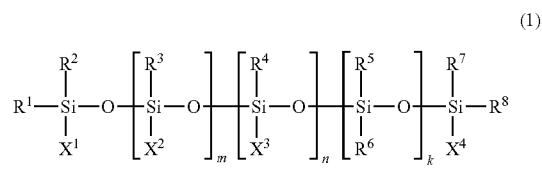

(1)

wherein, in the general formula (1) above, $R^1$ to $R^8$ are an alkyl group having 1 to 6 carbon atoms, or an aryl group having 6 to 12 carbon atoms, these may be the same or may be different from each other; $X^1$ and $X^4$ are any group selected from the group consisting of an alkyl group having 1 to 6 carbon atoms, aryl group having 6 to 12 carbon atoms, alkoxy group having 1 to 5 carbon atoms, and epoxy-group containing group having 4 to 12 carbon atoms, these may be the same or may be different from each other; $X^2$ is an alkoxy group having 1 to 5 carbon atoms, or an epoxy-group containing group having 4 to 12 carbon atoms, and when there are a plural number of $X^2$, they may be the same or may be different from each other; $X^3$ is a group containing 2 to 20 repeating units of alkylene glycol, and when there are a plural number of $X^3$, they may be the same or may be different from each other; and "m" is an integer of 1 to 200, "n" is an integer of 0 to 200, "k" is an integer of 0 to 200, and m+n+k is 1 or more.

3. The method for producing the conjugated diene rubber according to claim 1, wherein the vinyl compound having the functional group interactive with the silica is a compound represented by the following general formula (2),

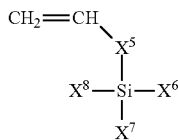

(2)

wherein, in the general formula (2) above, $X^5$ represents a chemical single bond or a hydrocarbylene group, and $X^6$, $X^7$ and $X^8$ each independently represent a substituted amino group, a hydrocarbyloxy group, or a substituted or unsubstituted hydrocarbyl group.

4. The method for producing the conjugated diene rubber according to claim 1, wherein the hydrocarbyloxysilane compound is a hydrocarbyloxysilane compound having a group containing a nitrogen atom.

5. The method for producing the conjugated diene rubber according to claim 4, wherein the group containing the nitrogen atom is a group containing a primary amino group having an active hydrogen atom and/or a secondary amino group having an active hydrogen atom.

6. The method for producing the conjugated diene rubber according to claim 1, wherein
the first step comprises:
a step of polymerizing a monomer (a) containing isoprene using the polymerization initiator in the inert solvent to form a polymer block (A) having an active end; and
a step of mixing the polymer block (A) having the active end and a monomer (b) containing 1,3-butadiene to continue polymerization reaction, so as to obtain the conjugated diene polymer chain that has an active end and comprises the polymer block (A) and the polymer block (B), and
the vinyl compound having the functional group interactive with the silica is contained in at least one of the monomer (a) and the monomer (b).

7. The method for producing the conjugated diene rubber according to claim 1, further comprising a step of reacting a modifier containing a nitrogen atom with a part of the active end of the conjugated diene polymer chain having the active end before reacting the siloxane compound with the conjugated diene polymer chain having the active end in the second step.

8. The method for producing the conjugated diene rubber according to claim 7, wherein the modifier containing the nitrogen atom is a modifier containing the nitrogen atom and not containing a silicon atom.

9. The method for producing the conjugated diene rubber according to claim 8, wherein the modifier containing the nitrogen atom and not containing the silicon atom is N-substituted cyclic amides.

10. The method for producing the conjugated diene rubber according to claim 1, wherein the polymerization initiator is an organic monolithium compound or an organic polyvalent lithium compound.

11. The method for producing the conjugated diene rubber according to claim 1, wherein the amount of the polymerization initiator to be used is in the range of 1 to 50 mmol with respect to 1000 g of the monomers.

12. The method for producing the conjugated diene rubber according to claim 1, wherein a polar compound is used in addition to the polymerization initiator in the first step, and the vinyl bond content in the conjugated diene monomer unit of the conjugated diene polymer chain having an active end obtained in the first step is 3 wt % or more.

13. The method for producing the conjugated diene rubber according to claim 1, wherein the amount of the vinyl compound having the functional group interactive with silica to be used is an amount so that the content ratio of a unit of vinyl compound having the functional group interactive with silica in the conjugated diene polymer chain having the active end obtained in the first step becomes 0.01 to 20 wt %.

14. The method for producing the conjugated diene rubber according to claim 3, wherein, in the general formula (2) above, at least one of $X^6$, $X^7$, and $X^8$ is a substituted amino group.

15. The method for producing the conjugated diene rubber according to claim 3, wherein, in the general formula (2) above, $X^5$ is a chemical single bond, $X^6$ and $X^7$ are each a diethylamino group, and $X^8$ is a methyl group.

* * * * *